(12) United States Patent
Funke et al.

(10) Patent No.: US 11,999,380 B1
(45) Date of Patent: Jun. 4, 2024

(54) AUTONOMOUS VEHICLE TRAJECTORY GENERATION AND OPTIMIZATION

(71) Applicant: Zoox, Inc., Foster City, CA (US)

(72) Inventors: Joseph Funke, Redwood City, CA (US); Steven Cheng Qian, San Francisco, CA (US); Kazuhide Okamoto, Mountain View, CA (US); Jacob Patrick Thalman, San Francisco, CA (US); Sriram Narayanan, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 202 days.

(21) Appl. No.: 17/554,693

(22) Filed: Dec. 17, 2021

(51) Int. Cl.
*B60W 60/00* (2020.01)
(52) U.S. Cl.
CPC ..... *B60W 60/0011* (2020.02); *B60W 2520/06* (2013.01); *B60W 2520/10* (2013.01); *B60W 2520/12* (2013.01)
(58) Field of Classification Search
CPC ......... B60W 60/0011; B60W 2520/06; B60W 2520/10; B60W 2520/12
See application file for complete search history.

(56) References Cited

U.S. PATENT DOCUMENTS

| | | | | | |
|---|---|---|---|---|---|
| 2008/0246876 | A1* | 10/2008 | Hayner | ................. | H04N 7/012 348/448 |
| 2009/0276705 | A1* | 11/2009 | Ozdemir | ................ | G06V 40/20 715/708 |
| 2018/0356830 | A1* | 12/2018 | Haghighat | ............ | H04L 67/306 |
| 2019/0346562 | A1* | 11/2019 | Peng | ....................... | G05D 1/101 |
| 2020/0117199 | A1* | 4/2020 | Akella | ................. | G05D 1/0088 |
| 2021/0253131 | A1* | 8/2021 | Sen | ......................... | G06N 3/088 |
| 2021/0275098 | A1* | 9/2021 | Tian | ........................ | G01C 17/00 |
| 2022/0032925 | A1* | 2/2022 | Liu | ........................ | B60W 40/10 |
| 2022/0144308 | A1* | 5/2022 | Takhmar | ........... | B60W 30/0956 |
| 2022/0300743 | A1* | 9/2022 | Imran | ................... | G01S 13/867 |

FOREIGN PATENT DOCUMENTS

| | | | | | |
|---|---|---|---|---|---|
| CN | | 112977603 A | * | 6/2021 | .......... B62D 15/021 |
| JP | JP-WO2007018188 | A1 | * | 2/2007 | |
| JP | | 2021178606 | * | 11/2021 | |
| WO | WO-2020134855 | A1 | * | 7/2020 | .......... H04B 1/7102 |
| WO | WO-2021128184 | A1 | * | 7/2021 | |

* cited by examiner

*Primary Examiner* — Redhwan K Mawari
(74) *Attorney, Agent, or Firm* — Lee & Hayes, P.C.

(57) ABSTRACT

Techniques are discussed for generating and optimizing trajectories for controlling autonomous vehicles in performing on-route and off-route actions within a driving environment. A planning component of an autonomous vehicle can receive or generate time-discretized (or temporal) trajectories for the autonomous vehicle to traverse an environment. Trajectories can be optimized, for example, based on the lateral and longitudinal dynamics of the vehicle, using loss functions and/or costs. In some examples, the temporal optimization of a trajectory may include resampling a previous trajectory based on the differences in the time sequences of the temporal trajectories, to ensure temporal consistency of trajectories across planning cycles. Constraints also may be applied during temporal optimization in some examples, to control or restrict driving maneuvers that are not supported by the autonomous vehicle.

18 Claims, 13 Drawing Sheets

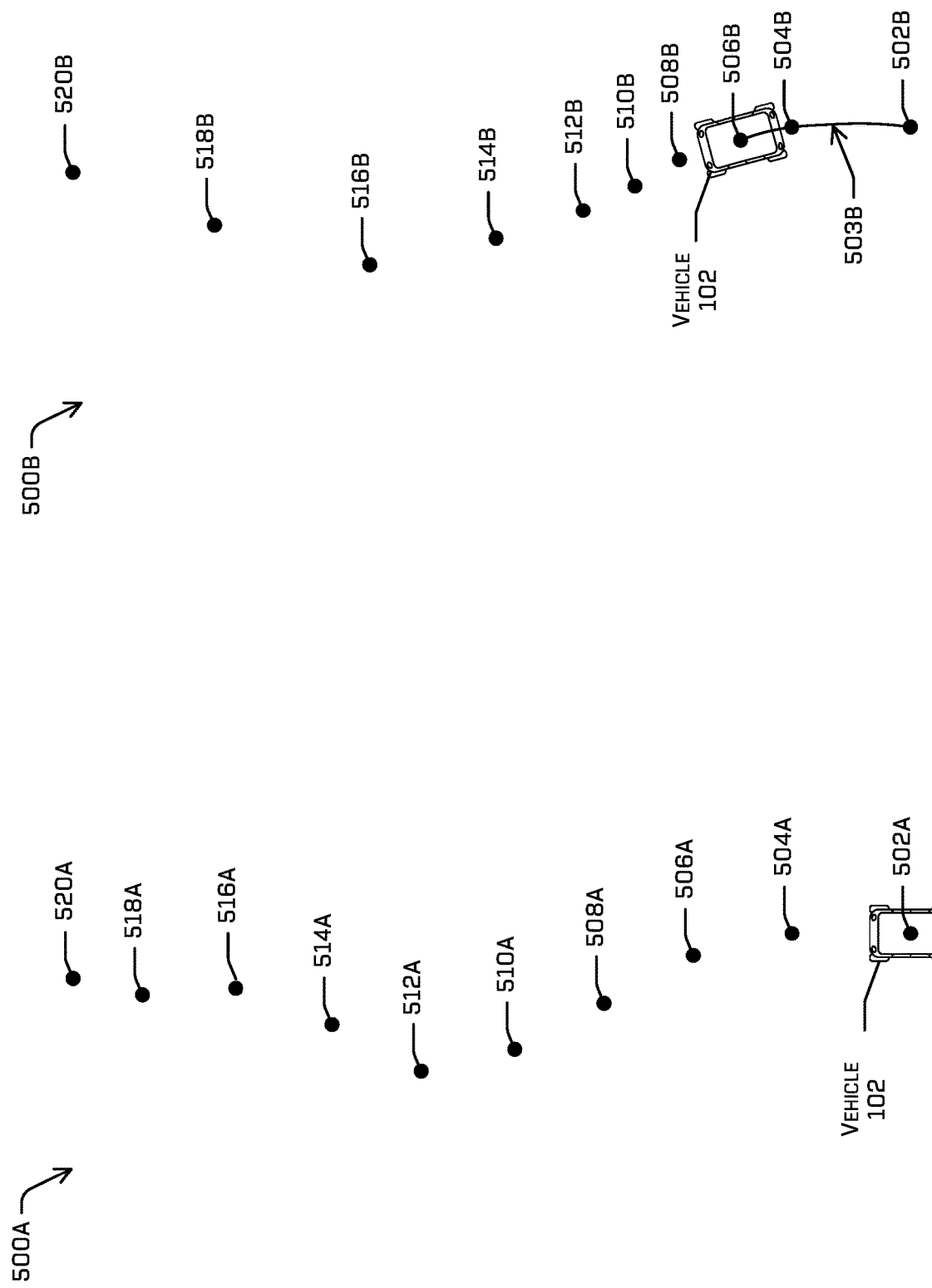

AUTONOMOUS VEHICLE TRAJECTORY GENERATION AND OPTIMIZATION

BACKGROUND

Autonomous vehicles use various techniques to navigate through driving environments that include static and dynamic objects. For instance, autonomous vehicles may use route planning and optimization techniques to determine trajectories for traversing through congested areas with other moving vehicles (autonomous or otherwise), pedestrians, a variety of stationary objects, etc. However, generating and optimizing trajectories for safe and effective navigation of autonomous vehicles can be a complex technical task involving a large number of variables. For example, an autonomous vehicle may include multiple subsystems that interact in complex ways. Additionally, anticipated or observed changes to the driving environment (e.g., object movements) also may increase the complexity of generating and optimizing trajectories for the vehicle to safely and effectively navigate the environment.

Certain autonomous vehicles may include computing systems configured to navigate from an initial location toward a destination within a route-based reference frame. Route-based reference frames may reduce the computational complexity associated with controlling autonomous vehicles in the environment. However, route-based reference systems may limit vehicle operations to the designated routes associated with the route-based reference frame. Such limitations may restrict the autonomous vehicle from performing particular actions, such as parking, pulling over, reversing, or the like. As a result, generating and optimizing trajectories for "off-route" driving maneuvers that occur outside of route-based reference frames, may include even greater complexity and unpredictability for the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 5A and 5B illustrate additional example techniques of determining updated trajectories based on temporal resampling of a current trajectory, in accordance with one or more examples of the disclosure.

DETAILED DESCRIPTION

Figure 1A:
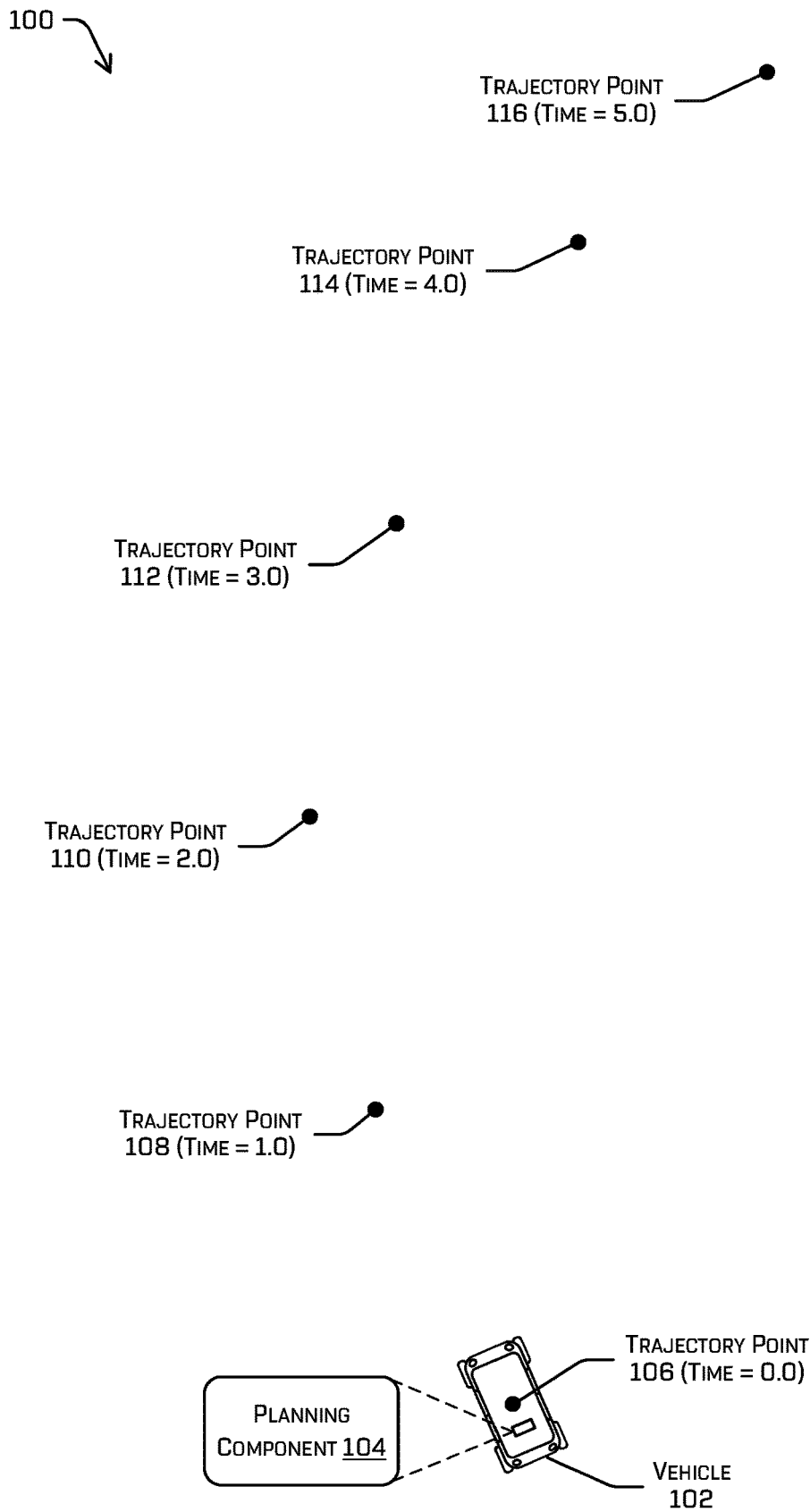
FIGS. 1A to 1D illustrate example techniques of determining and evaluating an updated trajectory using temporal optimization by an autonomous vehicle, in accordance with one or more examples of the disclosure.

The techniques discussed herein relate to generating trajectories for controlling autonomous vehicles to perform on-route and off-route actions within driving environments. As described in various examples below, a planning component of an autonomous vehicle can generate a trajectory for the autonomous vehicle to traverse a route through an environment, from a current location to a target location. A target location may include a destination of the vehicle or may include an intermediary point on a spatial and/or time horizon along the route of the vehicle towards a farther destination. As described herein a trajectory may be represented as a number of trajectory points (e.g., waypoints) that are positioned between the current location of the vehicle and a target location. In some examples, each trajectory point may include vehicle state data (e.g., position, orientation, velocities, and/or accelerations) and/or a set of vehicle control commands (e.g., steering commands, acceleration commands, braking commands, and the like). Each point in a trajectory may be fixed in time and/or may be fixed in space. Within the trajectory, the vehicle control commands may include data representing signals that may be sent to drive the actuators of the vehicle, such as those for brakes, steering, accelerators, suspensions, and/or other vehicle controls. The vehicle states and/or control commands within a trajectory may correspond to various maneuvers (or actions), including slowing or stopping the vehicle, moving the vehicle according to some details of the trajectory, changing the vehicle direction or speed, etc. In some cases, a trajectory might not necessarily play out to its target, but may be modified and/or overridden by the planning component (or other vehicle control systems) while the vehicle is traversing the environment. For example, variances of a vehicle from a planned trajectory, such as a change in the vehicle velocity or steering, and/or changes to the objects detected in the environment, may cause a planning component of the vehicle to generate a new trajectory.

A vehicle trajectory may be stored as a data structure including the set of trajectory points. For each trajectory point, the trajectory data structure may store a vehicle state data, such as a vehicle location, time, movement vector, and/or any other vehicle state data, as well as vehicle command controls associated with the trajectory point. As a whole, the sequence of trajectory points can be used for monitoring and controlling the vehicle from its start location and state to the target location and state of the trajectory. In some examples herein, a trajectory may be referred to as a spatial trajectory or temporal trajectory. A spatial trajectory may include a number of space-discretized trajectory points, in which each trajectory point is associated with a fixed physical location and is not necessarily (but may be) associated with a fixed time. In contrast, a temporal trajectory may include a number of time-discretized trajectory points, in which each trajectory point is associated with a fixed time and is not necessarily (but may be) associated with a fixed physical location. Accordingly, a trajectory point in a spatial trajectory may define the vehicle state data and vehicle control commands that are associated with the particular physical location of the trajectory point, whereas a trajectory point in a temporal trajectory may define the vehicle state data and vehicle control commands that are associated with the particular time of the trajectory point. When navigating based on spatial and/or temporal trajectories, the planning component of the autonomous vehicle may monitor the vehicle states and execute the control commands of the trajectory, at the associated spatial locations and/or times, thereby controlling the vehicle to traverse the trajectory to the target location.

An autonomous vehicle may determine and execute trajectories in driving environments with route-based reference systems as well as off-route driving environments. A route-based reference system may include a coordinate frame and designated routes based on one or more maps of an environment. For instance, an autonomous vehicle may include a localization component and maps modeled in two or more dimensions that provide information about the environment, such as topologies (e.g., intersections), streets, roads, terrain, and the environment in general. In a route-based reference system, the autonomous vehicle may follow route-based trajectories toward a target location and may perform route-based actions such as continuing straight along a route, executing lane changes, merging or turning onto different roads, etc.

In contrast, driving environments that are not associated with route-based reference systems may be referred to as off-route environments. For example, parking lots, driveways, school or corporate campuses, and/or other private road systems might not be included in any route-based reference system(s) available to the autonomous vehicle. Additionally, construction projects, road damage, and/or vehicle accidents might alter route-based reference systems by closing lanes, diverting traffic, etc. In these environments, the autonomous vehicle may perform off-route actions that do not correspond to designated roads, sidewalks, or other throughways defined by a route system. To perform off-route actions, the planning component may generate off-route trajectories, such as trajectories within parking lots, or trajectories to perform maneuvers such as parking, pulling over, going in reverse, etc.

In some examples, temporal trajectories may provide particular advantages (e.g., in contrast to spatial trajectories) for navigating off-route environments. For instance, off-route actions such as parking maneuvers, pulling over for passenger pick-ups or drop-offs, and the like, may be more time-sensitive than standard on-route driving actions. Additionally, off-route actions may include reversing the vehicle and similar maneuvers which can cause errors in trajectory generation and optimization operations on spatial trajectories that do not include temporal data associated with the trajectory vehicle states or controls. However, generating and optimizing temporal trajectories may result in additional technical challenges and/or greater complexity caused by the time-discretized vehicle states and controls of the temporal trajectories. For instance, trajectory modification and/or optimization operations that include comparing alternative trajectories (including updated a current trajectory) may be error-prone and/or computationally expensive to perform on trajectories having incompatible time sequences (e.g., time offsets and/or different time step durations). Further, temporal optimization techniques using loss functions and/or costs may output optimized trajectories that are restricted or that cannot be performed by the autonomous vehicle, such as dry steering trajectories or sharp steering trajectories based on the velocity of the vehicle. Such errors may introduce unsafe behaviors in a vehicle.

To address the technical challenges associated with generating and optimizing trajectories for autonomous vehicles, the techniques described herein include temporal trajectory generation and temporal trajectory optimization for use in performing on-route and off-route driving actions. As described in more detail below, a planning component of an autonomous vehicle can determine time-discretized (or temporal) trajectories for traversing an environment and/or performing a driving action. The temporal trajectory can be optimized, for example, based on the lateral and longitudinal dynamics of the vehicle, using loss functions and/or costs. In certain examples, a trajectory may be resampled based on a time difference between a trajectory point in the trajectory and a separate time associated with a different vehicle state. The planning component may determine one or more resampled trajectory points from the previous trajectory, using a vehicle model and based on the time differences (and/or spatial differences) between previous trajectory points and the resampled trajectory points. For each resampled trajectory point, the planning component may to determine an updated vehicle state and/or vehicle control commands for the resampled trajectory points. A resampled trajectory may be determined, for example, in response to a change in the vehicle velocity and/or steering that was not anticipated when the previous trajectory was generated. In some cases, resampled trajectories may be used to determine updated trajectories for the vehicle to follow to the same target location or a different target location. In certain examples, the temporal optimization of a trajectory may include resampling a previous trajectory based on the differences in the time sequences of the temporal trajectories, to ensure temporal consistency of trajectories across planning cycles. Additionally or alternatively, constraints may be applied during temporal optimization to control and/or restrict driving maneuvers that are not supported by the autonomous vehicle.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context, or in any system generating a trajectory. Additionally, the techniques described herein can be used with real data (e.g., captured using sensor(s)), simulated data (e.g., generated by a simulator), or any combination of the two.

Figure 1B:
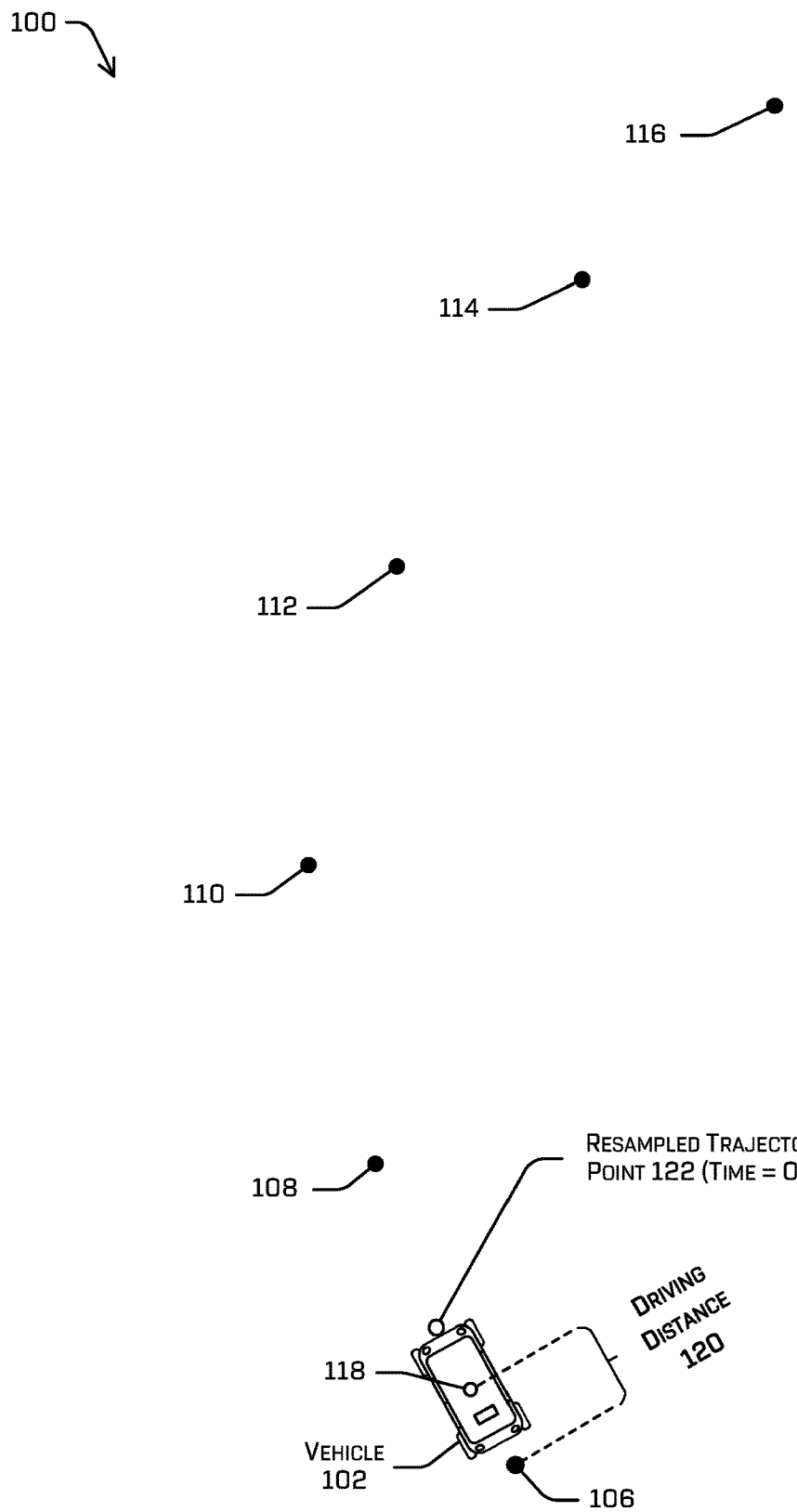
Figure 1C:
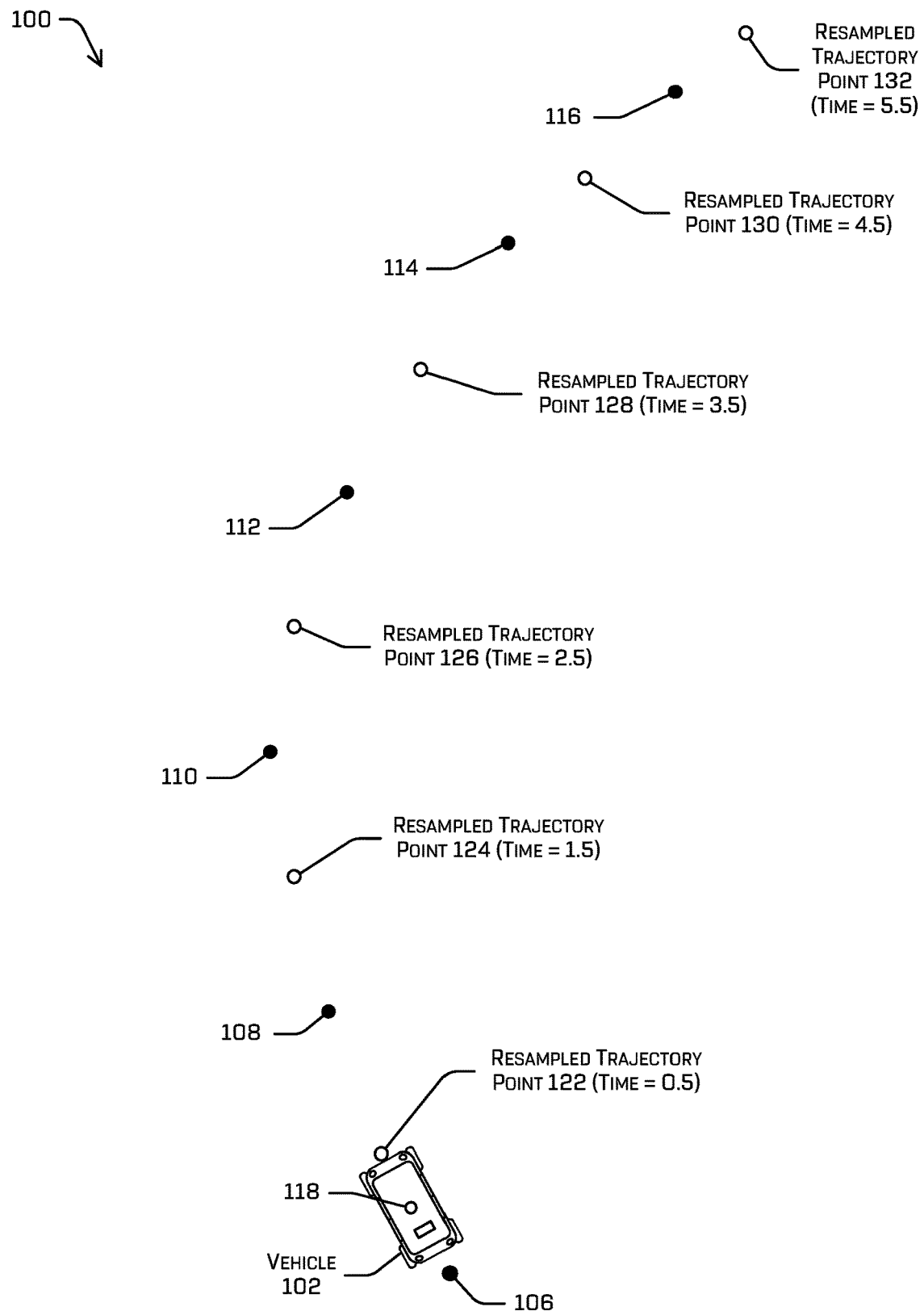

FIG. 1A to FIG. 1C depicts an example technique for generating and resampling a trajectory for the vehicle 102 to traverse through the environment 100. As described in this example, a planning component 104 of the vehicle 102 may determine an initial trajectory (shown in FIG. 1A) for the vehicle 102 to navigate through the environment 100. As the vehicle 102 is following the initial trajectory, the planning component 104 may determine to resample the trajectory and may generate one or more resampled trajectory points (shown in FIG. 1B) based on the initial trajectory. The planning component 104 then may determine and/or optimize an updated trajectory (shown in FIG. 1C) based on resampled trajectory points, and the vehicle 102 may use the updated trajectory to navigate through the environment 100 to the target location.

In this example, FIG. 1A depicts an example trajectory for the vehicle 102 to navigate through the environment 100. As noted above, a trajectory for a vehicle may be represented as a sequence of trajectory points, each of which may include vehicle state data and/or vehicle control commands associated with the particular space and/or time along a driving path of the vehicle between its current location and a target location. In this example, the planning component 104 may determine the trajectory depicted in FIG. 1A at a first time corresponding to trajectory point 106. The trajectory depicted in FIG. 1A may include a sequence of additional trajectory points, including trajectory point 108 (e.g., at Time=1.0), trajectory point 110 (e.g., at Time=2.0), trajectory point 112 (e.g., at Time=3.0), trajectory point 114 (e.g., at Time=4.0), and trajectory point 116 (e.g., at Time=5.0). Although in this example, the trajectory points 106-116 may be time-fixed points that are associated with particular times relative to the time of a first trajectory point 106, in other examples the trajectory points may be spatially-fixed points that are associated with particular locations relative to the location of the first trajectory point 106.

In FIG. 1B, as the vehicle 102 traverses the environment 100, the planning component 104 may determine to resample the trajectory. Resampling a trajectory may include determining one or more additional trajectory points associated with a previously determined trajectory, such as a trajectory currently being followed by the vehicle 102. The additional trajectory points, which may be referred to resampled trajectory points, may be trajectory points that were not included in the initial trajectory as originally generated. However, the resampled trajectory points may correspond to newly generated trajectory points associated with additional times and/or locations along the same continuous driving path of the initial trajectory, between the current location of the vehicle 102 and the target location defined by the initial trajectory. Each resampled trajectory point, like the trajectory points in an initial trajectory, may include vehicle state data and/or vehicle control commands associated with a particular time and/or location on the driving path of the vehicle 102.

The planning component 104 may determine to resample a vehicle trajectory for any number of reasons. In some cases, the planning component 104 (or another vehicle component) may change the vehicle velocity and/or steering in a way that was not anticipated when the initial trajectory was generated. For instance, the planning component 104 may temporarily slow or stop the vehicle 102 in response to an object detected into the path of vehicle. In this example, as a result of the change of the velocity of the vehicle 102, one or more of the subsequent trajectory points 108-116 may no longer be valid with respect to their associated fixed times. In other examples, the planning component 104 may determine to resample an existing trajectory based on a variance determined between a current vehicle state and a state anticipated by the trajectory, a determination that a more detailed and granular trajectory is needed with additional trajectory points, and/or changes in the environment 100 or to the target location of the vehicle.

In this example, after controlling the vehicle 102 for a duration of time based on the initial vehicle trajectory shown in FIG. 1A, the planning component 104 may determine to resample the trajectory. As shown in FIG. 1B, the vehicle 102 has traversed the environment 100 to a point 118 corresponding to a driving distance 120 from the first trajectory point 106 of the initial trajectory. The planning component 104 may resample the trajectory at point 118 and/or any subsequent point while navigating the environment 100. In this example, the planning component 104 may determine a resampled trajectory point 122 (e.g., corresponding to Time=0.5).

As described below in more detail, to determine the vehicle state and/or vehicle control commands for the resampled trajectory point 122, the planning component 104 may instantiate a vehicle model (e.g., a simulated vehicle controller) based on the vehicle 102, and may configure the vehicle model based on the vehicle state of the initial trajectory point 106. The planning component 104 then may execute the model and run the vehicle control commands associated with the trajectory point 106 for a duration of time equal to the time difference between the initial trajectory point 106 and the resampled trajectory point 122. After executing the vehicle model as described above, the resulting state of the vehicle model may correspond to the vehicle state of a resampled trajectory point. Although the resampled trajectory point 122 in this example is determined for a time offset of 0.5 seconds from the initial trajectory point 106, in other examples planning component 104 may resample a trajectory point for the current location of the vehicle 102 (e.g., point 118) and/or for any other point along the driving path of the vehicle. As described in more detail below, in some examples the planning component 104 may determine a resampled trajectory point associated with the current location of the vehicle 102 (e.g., point 118), and may compare the vehicle state of the resampled trajectory point to the current vehicle state, to determine a metric of the variation between the intended trajectory and the vehicle path.

FIG. 1C depicts a resampled trajectory for the vehicle 102 to navigate through the environment 100. As with the initial trajectory depicted in FIG. 1A, the resampled trajectory shown in FIG. 1C may be represented as a sequence of trajectory points. In this example, the planning component 104 may determine a number of resampled trajectory points starting at or near point 118. In this example, the resampled trajectory depicted in FIG. 1C may include resampled trajectory point 122 (e.g., at Time=0.5), resampled trajectory point 124 (e.g., at Time=1.5), trajectory point 126 (e.g., at Time=2.5), resampled trajectory point 128 (e.g., at Time=3.5), resampled trajectory point 130 (e.g., at Time=4.5), and resampled trajectory point 132 (e.g., at Time=5.5). As in the previous example, the resampled trajectory points 122-132 may be time-fixed points that are associated with particular times relative to the time of the first resampled trajectory point 122. Additionally, although the time values associated with the trajectory points 108-116 and the resampled trajectory points 122-132 may be referred to in seconds, in various examples these values may correspond to any unit of time (e.g., N deciseconds, N centiseconds, etc.).

In some cases, after determining the updated (e.g., resampled) trajectory defined by resampled trajectory points 122-132, the planning component 104 may control the vehicle 102 to follow the updated trajectory. For instance, the planning component 104 may ignore the initial trajectory depicted in FIG. 1A, and may switch the vehicle 102 to following the updated trajectory. In other instances, when the initial trajectory and updated trajectory are associated with a same continuous driving path for the vehicle 102, then the initial trajectory may be updated to include the resampled trajectory points 122-132 as additional new points.

The trajectory points of a resampled trajectory points may be separated by a fixed times and/or by a fixed distance, which may be same time duration and/or the same distance as the trajectory points of the initial trajectory. The time steps separating the points in a trajectory may be of an equal and uniform time duration, or may be different for different trajectory points. In this example, the duration of the time steps for the resampled trajectory may be uniform and may be the same as the duration of the time steps initial trajectory (e.g., 1.0 seconds), but the initial trajectory and the resampled trajectory may be offset by 0.5 seconds. In other examples, a resampled trajectory may have time steps of a different duration, and/or may be offset by any amount, from an initial trajectory. For instance, when the velocity of the vehicle 102 changes unexpectedly (e.g., between a point of the initial trajectory and a corresponding point of the resampled trajectory), the resulting points in the resampled trajectory may have different time step durations from the initial trajectory, or may have the same time step duration but different distances between the trajectory points.

Figure 1D:
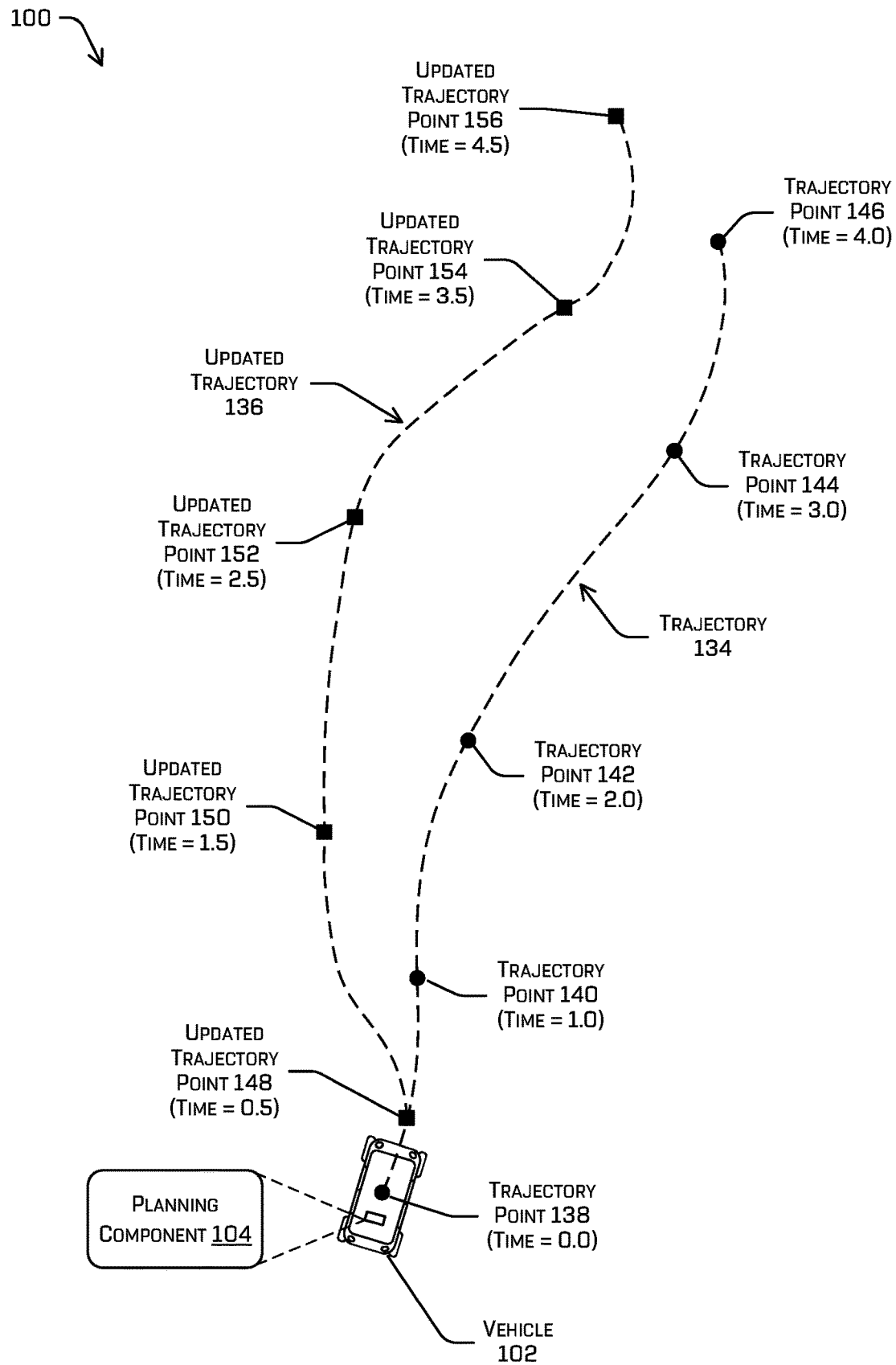

FIG. 1D depicts another example technique for generating and/or optimizing trajectories for the vehicle 102 to traverse through the environment 100. In this example, the environment 100 depicts two different trajectories for the vehicle 102: a trajectory 134 (e.g., a current trajectory) and an updated trajectory 136. As the vehicle 102 traverses the environment 100 in FIG. 1D, it may initially determine and follow trajectory 134. However, based on trajectory tracking/monitoring data, feedback from vehicle systems, and/or changes to the driving environment, the vehicle 102 may change its trajectory one or more times as it traverses the environment. In some cases, the planning component 104 may be configured to evaluate the current trajectory, and to generate and evaluate possible updated trajectories at periodic planning cycles (e.g., every 0.05 secs, 0.1 secs, etc.) as the vehicle traverses the environment. At each planning cycle, the planning component 104 may determine one or more alternative trajectories (e.g., updated trajectory 136), compare it to the trajectory currently being followed by the vehicle 102 (e.g., trajectory 134), and determine whether or not to change to the new trajectory. Although this example depicts a single alternative trajectory generated (e.g., updated trajectory 136) determined at a single point in time, it can be understood that any number of alternative trajectories may be determined and evaluated for the vehicle at any number of points as the vehicle 102 traverses the environment 100.

In various examples, the trajectory 134 and the updated trajectory 136 may represent reference trajectories and/or optimized trajectories for the vehicle 102. As described below in more detail in reference to FIG. 7, n a reference trajectory may correspond to an "ideal" route based at least in part on the route provided by a route planner component. For instance, a reference trajectory can correspond to a centerline of a road segment or any drivable surface. In some instances, a reference trajectory can be generated based at least in part on static obstacles in an environment, a minimum or maximum longitudinal acceleration or velocity, a maximum steering angle, vehicle dynamics, etc. An optimized trajectory may be generated, for example, using one or more models, algorithms, constraints, and/or costs to determine an optimized trajectory for the vehicle 102 based on a reference trajectory. For instance, a trajectory optimizer may determine an optimized trajectory from a reference trajectory using models or algorithms based on the vehicle dynamics (e.g., lateral and longitudinal dynamics), constraints (e.g., physical properties of the vehicle and/or environment), and/or costs (e.g., an optimal vehicle speed or velocity, minimizing lateral acceleration, lane positioning, maintaining a minimum safe distance from other objects or potential hazards, etc.). It can be understood that the techniques described herein for generation of temporal trajectories may be applied to routes, reference trajectories, optimized trajectories, and/or any other type of trajectories generated by a vehicle 102.

As the vehicle 102 traverses the environment, it may generate and follow a trajectory for a duration of time, after which it may determine and follow a new trajectory (and/or modify the current trajectory) for another duration of time, and so on throughout the environment 100. During a driving action or maneuver, the vehicle 102 may repeatedly perform trajectory tracking and evaluation, generation, and optimization operations and may perform these processes continuously based on the planning cycle of the planning component 104. As a result, the trajectory currently followed (or tracked) by the vehicle 102 may be, rather than one continuous trajectory, frequency changing from one trajectory to a different/optimized trajectory as the vehicle 102 moves through the environment.

In this example, the trajectory 134 may be a current trajectory generated and followed by the vehicle 102 for a duration of time starting at time point 138 (corresponding to Time=0.0 secs). The trajectory 134 may include any number of additional trajectory points, including time point 140 (corresponding to Time=1.0 secs), time point 142 (corresponding to Time 2.0 secs), time point 144 (corresponding to Time 3.0 secs), and time point 146 (corresponding to Time 4.0 secs). The updated trajectory 136 may be another temporal trajectory generated by the planning component 104, at a later time while the vehicle 102 is following the current trajectory 134. In this example, the updated trajectory 136 may be generated at time point 148 (corresponding to Time=0.5 secs) and may include any number of additional trajectory points, including time point 150 (corresponding to Time=1.5 secs), time point 152 (corresponding to Time 2.5 secs), time point 154 (corresponding to Time 3.5 secs), and time point 156 (corresponding to Time 4.5 secs).

Accordingly, the current trajectory 134 and the updated trajectory 136 may be temporal trajectories in this example, in which vehicle state data and/or vehicle control data are stored for each time point in the trajectories. The time points 138-146 may define the time sequence for the current trajectory 134, and the time points 148-156 may define the time sequence for the updated trajectory 136. Although this example shows five time points defined for the current trajectory 134 and the updated trajectory 136, it can be understood that these trajectories (and/or any other trajectories described herein) can include any number of time points representing particular vehicle states and/or particular vehicle control commands within the trajectories. Additionally, although this example depicts uniform time sequences for the current trajectory 134 and the updated trajectory 136, in which each time step is the same duration, in other examples, temporal trajectories may include non-uniform time sequences in which a trajectory has time steps of different durations.

At or near time point 148, the planning component 104 may evaluate the current trajectory 134 and/or the updated trajectory 136, and may determine whether or not to change the vehicle 102 to follow the updated trajectory 136. In some examples, the planning component 104 need not expressly evaluate the current trajectory 134. Rather, at each periodic planning cycle, the planning component 104 may determine one or more new reference trajectories and/or optimized trajectories for the vehicle 102 to follow. As noted above, the planning component 104 may determine reference and/or optimized trajectories using various models and/or algorithms based on any number of factors, such as the vehicle dynamics, constraints, costs, etc. In this example, the planning component 104 may select the updated trajectory 136 as the optimized trajectory at time point 148, by using a loss function and/or cost model implemented by an optimized trajectory component, and may control the vehicle to change to the updated trajectory 136.

In some examples, the planning component 104 may take into account trajectory consistency and/or vehicle dynamics consistency when selecting a trajectory for the vehicle 102 to follow during a planner cycle. As an example, the planning component 104 may select a less optimal trajectory over a more optimal trajectory at a particular time point, if the less optimal trajectory has a greater level of consistency with the current and/or previous trajectories followed by the vehicle 102. The metrics for measuring trajectory consistency may be determined based on the physical distance between corresponding trajectory points (e.g., between a proposed trajectory and previous trajectory), and/or in terms of the lateral and longitudinal vehicle dynamics of the vehicle 102 at the corresponding vehicle states between the trajectories. To maintain trajectory consistency as the vehicle 102 traverses the environment 100, the planning component 104 may use an optimization component configured to perform a temporal optimization process, in which a trajectory consistency metric(s) is provided as input to the optimization process (e.g., as a variable in a loss function, as a cost within a cost model, etc.). By taking trajectory inconsistency into account as a cost or other factor within temporal optimization, the resulting optimized trajectories for the vehicle 102 may provide improved efficiency and vehicle safety. For example, selecting trajectories with greater consistency may result in improved passenger comfort metrics (e.g., less vehicle jerkiness, fewer instances of rapid acceleration or deceleration, etc.) and fewer potential vehicle safety hazards. Additionally, trajectories with greater consistency may improve computational efficiency and reduce process loading for vehicle navigation systems such as object detection, trajectory prediction, and object tracking.

However, when determining and using trajectory consistency metrics for temporal trajectories, the time sequences for the trajectories may be offset or otherwise out of sync. For instance, as shown in this example, the sequence of time points for the current trajectory 134 is offset from the sequence of time points for the updated trajectory 136. Therefore, to determine a measurement of consistency between the current trajectory 134 and the updated trajectory 136, the planning component 104 may determine a time difference between the time points of the trajectories and may resample the current trajectory 134 based on the time difference. In this example, the time step duration is the same (e.g., 1.0 secs) for the current trajectory 134 and the updated trajectory consistency; however, the time sequences are offset by 0.5 secs. The time offset may be caused by different components of the vehicle 102 perceiving the environment 100, generating trajectories, or evaluating/optimizing trajectories at different times and/or based on different processing cycles.

To resample the current trajectory 134, the planning component 104 may calculate the time difference between a time point in the current trajectory 134 and a nearby (e.g., nearest) time point in the updated trajectory 136. For instance, the time difference between time point 148 and time point 140 is 0.5 secs. The planning component 104 then may determine a new vehicle state and/or vehicle control time point for the current trajectory 134, corresponding to the same time point 148 in the updated trajectory 136. To determine a new vehicle state and/or vehicle control commands within the current trajectory 134, the planning component 104 may instantiate a vehicle model based on the vehicle 102 and assign the model to an initial state based on the previous time point of the current trajectory 134 (e.g., time point 110). The planning component 104 then may execute the control commands for time point 138 on the vehicle model, for a duration of time equal to the time difference between the current and updated trajectory (e.g., 0.5 secs). The state of the vehicle model when the time difference is reached may represent a new point on the current trajectory 134 associated with a corresponding time point on the updated trajectory 136. The planning component 104 may compare the vehicle states (e.g., positions, orientations, speeds, velocities, accelerations, etc.) and/or vehicle control commands (e.g., acceleration commands, steering commands, etc.) between the same time point in the current trajectory 134 and the updated trajectory 136, to the determine the trajectory consistency metric(s) between the trajectories at the time point.

In this example, based on the determined level of trajectory consistency between the current trajectory 134 and the updated trajectory 136 (and/or other cost factors), the planning component 104 may determine that the updated trajectory 136 is an optimal trajectory for the vehicle 102 to follow at time point 148. As a result, the planning component 104 may switch the vehicle 102 to the updated trajectory 136, by tracking the vehicle states and/or applying the vehicle control commands in the updated trajectory 136 (rather than those of the current trajectory 134) starting at time point 148.

Additionally, as noted above, the planning component 104 may apply constraints and/or other restrictions during temporal optimization in some cases, to control or restrict the driving actions that may occur within a temporal trajectory that are not supported by the vehicle 102. For example, dry steering actions (e.g., changing the steering rate while the vehicle is stopped) might not be supported by the planning component 104 or other components within the vehicle 102. For instance, the planning component 104 may be configured to generate spatial projections of a temporal trajectory during various trajectory tracking and optimization processes. However, a dry steering action within the temporal trajectory may prevent a spatial projection, as the planning component 104 may be unable to meaningfully infer a particular steering angle to track. As another example, the vehicle 102 may restrict certain steering rates above a steering threshold based on the current velocity of the vehicle, for instance, to prevent the vehicle 102 from performing sharp turns at high speeds. To enforce such constraints, the planning component 104 may implement hard constraints within a temporal trajectory optimization process, and/or may assign associated costs to the restricted actions within the cost models and/or loss functions used in the temporal optimization. As described below, the planning component 104 may use velocity-based steering activation functions in some cases, which may provide greater reliability than using costs, and may be implemented even when state-dependent constraints are not supported during temporal optimization.

Figure 2:
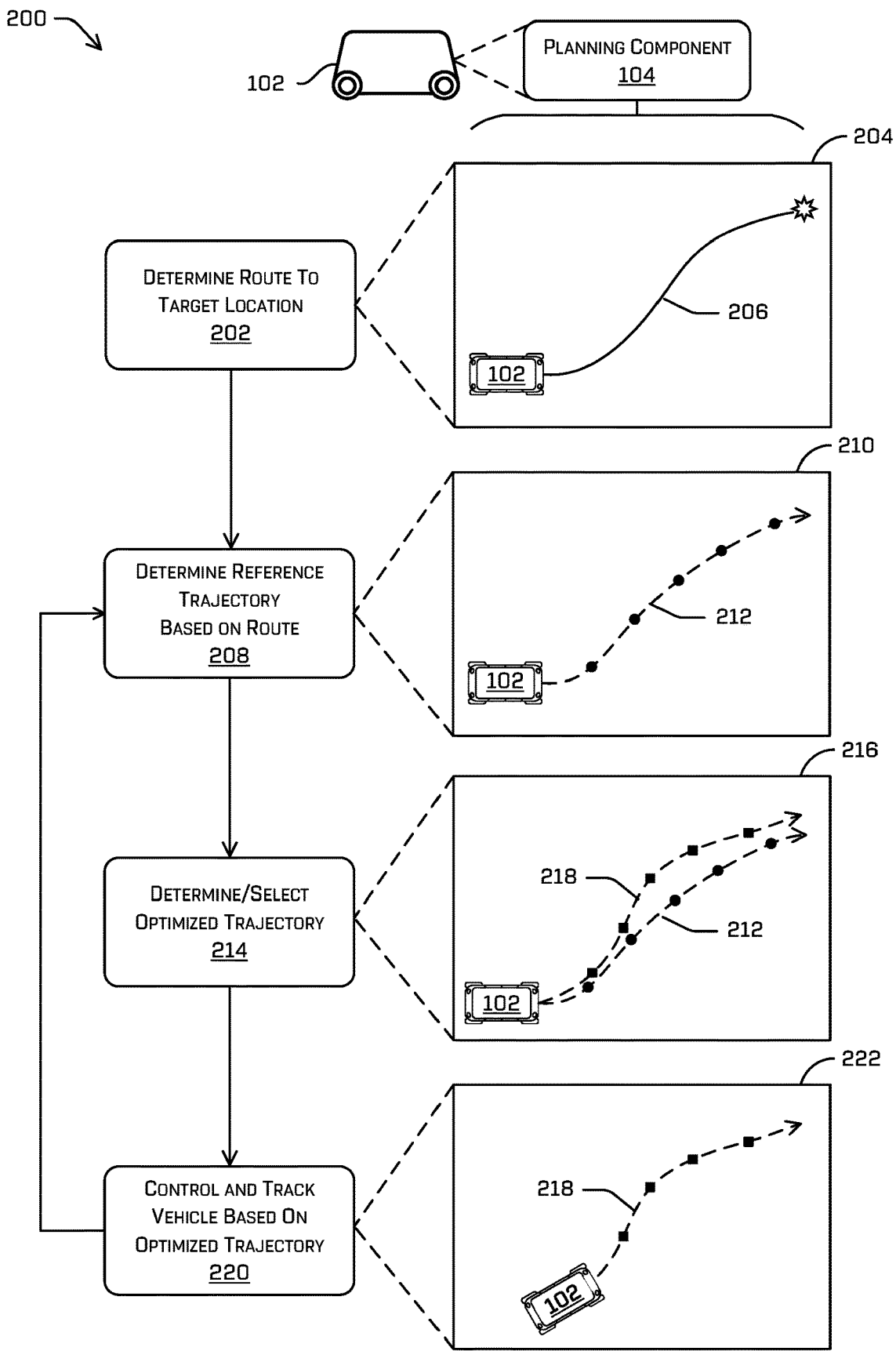
FIG. 2 is a pictorial flow diagram illustrating techniques for determining and optimizing trajectories for an autonomous vehicle, in accordance with one or more examples of the disclosure.

FIG. 2 is a pictorial flow diagram of an example process 200 of determining and optimizing trajectories for an autonomous vehicle traversing an environment. As shown in this example, some or all of the operations in the example process 200 may be performed by a planning component 104 of a vehicle 102. As described below in more detail, the planning component 104 may include various subcomponents configured to determine routes, reference trajectories, and optimized trajectories for the vehicle 102 through a driving environment. The planning component 104 also may include subcomponents to track the progress of the vehicle 102 relative to a selected trajectory, and perceive changes in the environment while the vehicle 102 is traversing the environment. Based on the feedback from the components or subsystems of the vehicle and/or perceived changes to the driving environment, the planning component 104 may periodically determine an updated trajectory and switch the vehicle 102 on-the-fly from a previous trajectory to an updated trajectory (e.g., where the vehicle begins to diverge from a calculated trajectory and/or the environment proximate the vehicle changes, etc.).

At operation 202, the planning component 104 may determine a route to a target location. In the example shown in box 204, the planning component 104 has determined a route 206 from the current location of the vehicle 102 to a target. As described above, the target location may be a destination (e.g., a parking spot, pull-off location, etc.) nearby to the vehicle 102, or may be an intermediate point on the way to a destination of the vehicle 102. Targets for routes and/or trajectories may be target locations (e.g., physical points in space) and/or may be target times corresponding to a time the vehicle 102 is predicted to reach a physical location. In some cases, target points may be points on a spatial horizon and/or time horizon determined based on the perception range of the vehicle 102. In such cases, as the vehicle continues to move toward the target, the space and/or time horizon of the vehicle may move along with the perception range of the sensors of the vehicle.

At operation 208, the planning component 104 may determine a reference trajectory for the vehicle 102, based on the current location of the vehicle and the route 206. In the example shown in box 210, the planning component 104 has determined a reference trajectory 212 from the current location of the vehicle 102 to the target location. As noted above, the reference trajectory 212 can be determined by a reference trajectory component of the planning component 104, as an "ideal" trajectory based on the route 206. In some examples, the reference trajectory component can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by a reference trajectory component within the planning component 104, and/or can be received from an external computing device (e.g., from a teleoperations center) via a network.

As shown in this example, the reference trajectory 212 (and/or any other trajectory) may represent a continuous driving path between the current location of the vehicle 102 and the target point. Although the reference trajectory 212 may represent a continuous path, it may be stored as a discreet sequence of vehicle states and/or vehicle control commands at a number of points along the path. As described above, the points within a trajectory storing vehicle states and/or vehicle control commands may be spatial points (e.g., points at discreet locations along the trajectory path), and/or may be time points (e.g., points at discreet times along the trajectory path. For a temporal trajectory including a sequence of time points (e.g., time-discretized data storing vehicle states and/or control commands), the time sequence may be defined by the time horizon and/or duration in time between the time points. In some cases, for temporal trajectories, the time sequence characteristics (e.g., horizon and/or time step duration) may be based on the current velocity of the vehicle 102, and thus may change when the velocity of the vehicle changes. For instance, when the velocity of the vehicle 102 changes, the planning component 104 may maintain the same duration of the time steps of the temporal trajectory, resulting in a horizon that is spatially different from the vehicle (e.g., closer or further away). In other examples, when the velocity of the vehicle 102 changes, the planning component 104 may maintain the same target point in space and adjust (e.g., increase or decrease) the duration of the time steps in the temporal trajectory.

At operation 214, the planning component 104 may determine and/or select an optimized trajectory based on the reference trajectory 212. In the example shown in box 216, the planning component 104 has determined an optimized trajectory 218 from the current location of the vehicle 102 to the target location, based on the reference trajectory. As in the above example, the optimized trajectory 218 may be a temporal trajectory including a time-discretized sequence of vehicle state data, vehicle control command data, etc., associated with particular time points. Although the points in a temporal trajectory may be associated with a time sequence, in some cases the time points also may include spatial data (e.g., predicted vehicle locations associated with each time point). In some examples, the planning component 104 may include an optimized trajectory component configured to perform an optimization based on the reference trajectory 212, to generate an optimized trajectory. In some cases, an optimized trajectory component within the planning component 104 can use a projected stage-wise Newton method to evaluate a plurality of loss functions to generate the optimized trajectory. Additional loss functions may be based at least in part on one or more of a lateral acceleration, a longitudinal acceleration, a trajectory curvature, a trajectory curvature rate, passenger comfort, trip duration, and the like. In some instances, optimizing the reference trajectory 212 to generate an optimized trajectory 218 can include substantially simultaneously evaluating the plurality of loss functions to determine the acceleration(s) and steering angles associated with an optimized trajectory 218. Additional examples of loss functions that may be used to determine an optimized trajectory are described in more detail below in reference to FIG. 7.

At operation 220, the planning component 104 may control the vehicle 102 to follow the optimized trajectory 218. In various examples, the planning component 104 may determine the vehicle control commands associated with the optimized trajectory 218 at different time points, including but not limited to steering commands, acceleration commands, braking commands, and/or safety control commands. The planning component 104 may use the vehicle control commands to control and monitor (or track) the vehicle as it traverses the environment along the optimized trajectory 218. In some cases, the planning component 104 may transmit the vehicle control commands to one or more one or more system controllers of the vehicle 102 to apply the commands via the drive system(s) of the vehicle 102.

Further, as shown in this example, the planning component 104 may be configured to perform operations 208, 214, and 220 multiple times in a repeating and/or periodic loop. As noted above, while the vehicle 102 is actively following (or executing) a particular trajectory, the planning component 104 and/or other components within the vehicle 102 may continue to track the progress of the vehicle relative to the trajectory, perceive new and changed objects in the environment, and/or receive signals from internal vehicle systems. Based on these additional data, the planning component 104 may determine, evaluate, and execute updated trajectories at any time while the vehicle 102 is traversing the environment. For instance, while performing a driving action or maneuver, the vehicle 102 may execute repeated and/or periodic operations for trajectory tracking, evaluation, generation, and optimization. Such operations may be performed continuously and/or periodically based on the planning cycle of the planning component 104. As a result, a trajectory currently followed (or tracked) by the vehicle 102 may be, rather than one continuous trajectory, frequency changing from one trajectory to a different/optimized trajectory as the vehicle 102 moves through the environment. For instance, for a temporal trajectory, the planning component 104 may perform operations 208, 214, and 220 repeatedly based on the planning cycle of the planning component 104 and/or based on the time steps within the optimized trajectory 218 currently being followed. In various examples, the looping of operations 208, 214, and 220 may be performed at any number of time intervals and/or physical location intervals (e.g., including uniform or non-uniform intervals). Looping and re-execution of operations 208, 214, and 220 also may be performed in response to the vehicle 102 detecting of an environment change, detecting a divergence between the vehicle 102 and its intended trajectory, etc.

Figure 3A:
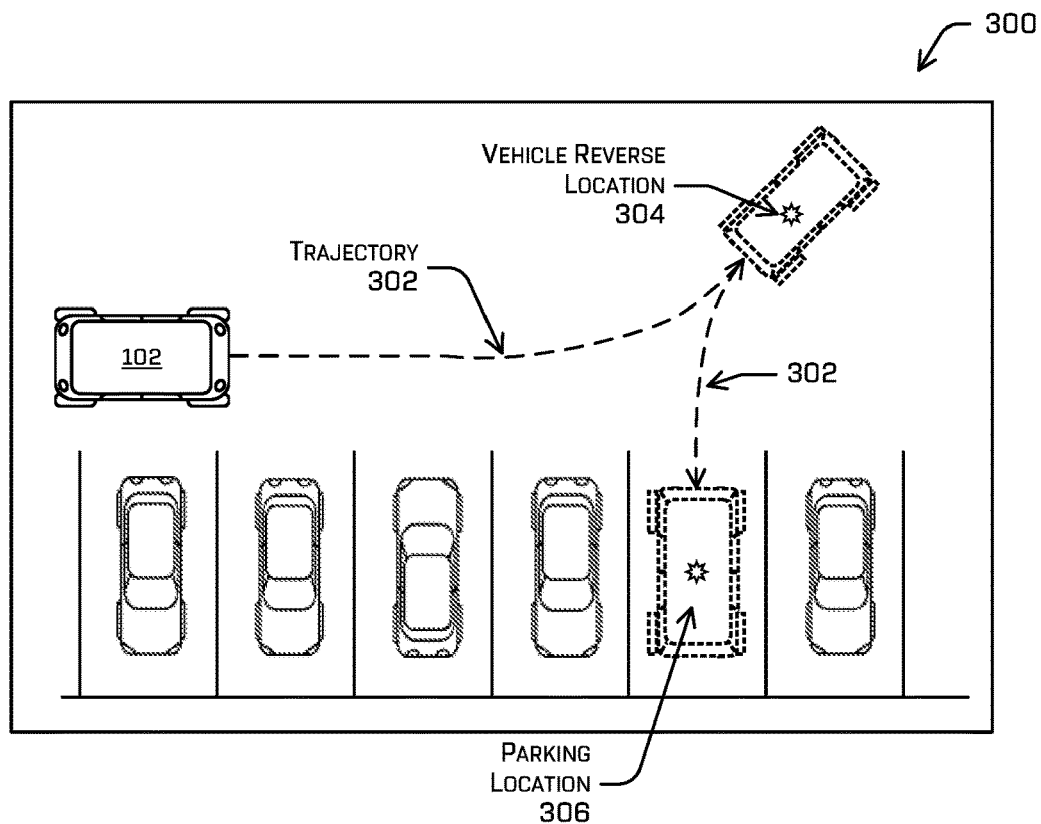
FIGS. 3A and 3B illustrate examples of determining trajectories for performing off-route driving maneuvers by an autonomous vehicle, in accordance with one or more examples of the disclosure.
Figure 3B:
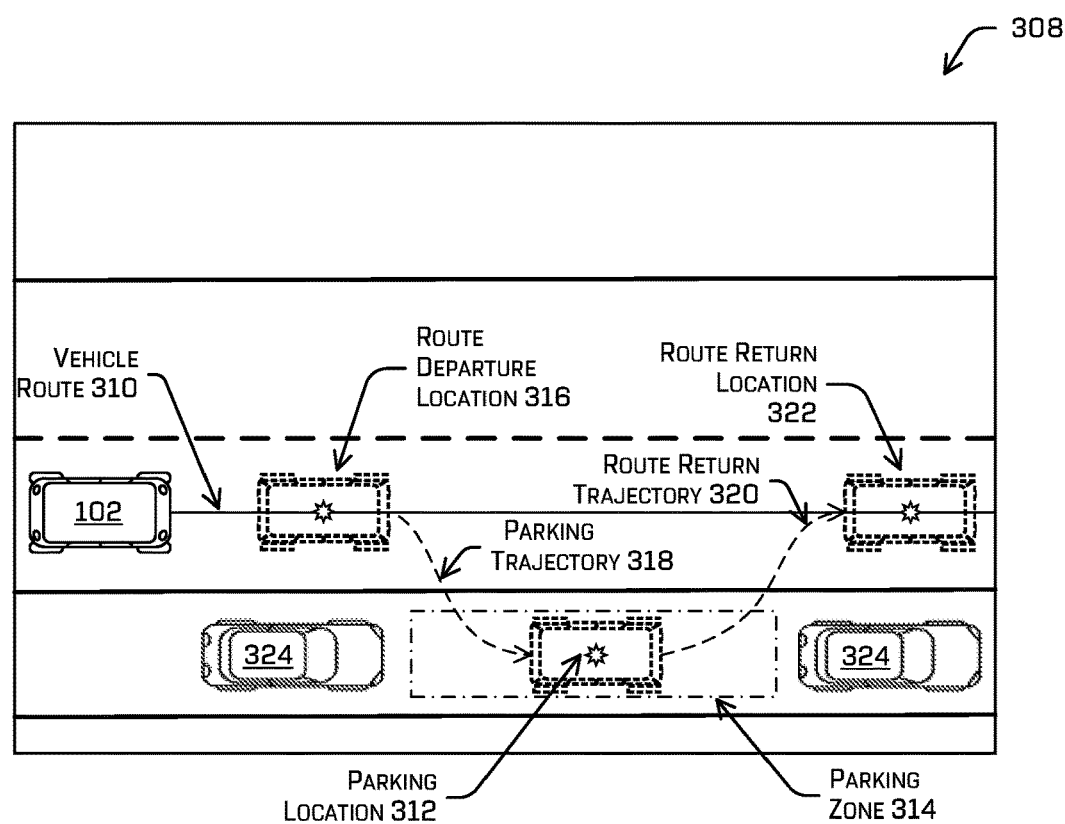

FIGS. 3A and 3B depict two examples an off-route driving actions (or maneuvers) that may be performed by the vehicle 102 based on generating and optimizing temporal trajectories. As described above, the techniques described herein for generating and optimizing temporal trajectories may be used to perform both on-route and off-route driving actions. However, temporal trajectory generation and optimization may provide additional advantages for off-route driving actions, such as parking, performing curbside pick-ups and drop-offs, and/or reversing the vehicle 102. For instance, off-route actions such as those shown in FIGS. 3A and 3B may be more time-sensitive than on-route driving actions, and/or may include actions (e.g., off-route stopping, reversing the vehicle, etc.) that may cause errors in spatial trajectory generation and optimization components. Accordingly, in some examples, the planning component 104 may generate temporal trajectories including time-discretized (e.g., rather than spatially discretized) trajectory vehicle states and actions, and may perform temporal trajectory optimization (e.g., rather than spatial optimization), to perform the off-route driving actions shown in FIGS. 3A and 3B.

FIG. 3A depicts a first environment 300 that includes the vehicle 102 performing a parking maneuver in an off-route environment (e.g., an inertial-based reference system). In this example, the vehicle 102 may be navigating within the off-route driving environment (e.g., a parking lot). While navigating, the vehicle 102 may identify a parking location 306. In some instances, within off-route environments the vehicle 102 may identify the parking location 306 using sensor data generated by one or more sensors of the vehicle 102. The sensor data may include data captured by cameras, lidar, radar, sonar, time-of-flight sensors, and/or other sensors associated with the vehicle. After identifying the parking location 306, the planning component 104 may determine an off-route parking trajectory 302 between the current location of the vehicle 102 and the parking location 306. The off-route parking trajectory 302 may be a temporal trajectory in some cases, and the planning component 104 may use a temporal optimization process to determine a cost associated with the off-route parking trajectory 302 (and/or other alternative parking trajectories). The planning component 104 may determine to control the vehicle 102 according to the off-route parking trajectory 302, from the current vehicle location, through the reverse location 304, and backing into the parking location 306. The selection of the off-route parking trajectory 302, including the reversing maneuver, may be based on a determination that the associated costs of the off-route parking trajectory 302 are less than one or more alternative parking trajectories. In various examples, the planning component 104 may control the vehicle 102 to execute the parking trajectory 302, during which the planning component 104 may periodically determine and/or update the parking trajectory 302 one or more times during the movement of the vehicle 102 to the parking location 306.

FIG. 3B depicts a second environment 308 that includes the vehicle 102 transitioning between a route-based reference system and an off-route environment (e.g., an inertial-based reference system) to perform a parking maneuver. In this example, the vehicle 102 may be navigating along a route 310 (e.g., a driving lane) and towards a target location. While navigating, the vehicle 102 may identify a parking location 312 within a parking zone 314. In some instances, the vehicle 102 may identify the parking zone 314 using map data that is available to the vehicle 102, where the map data indicates at least one of the parking zone 314 or the parking location 312 associated with the parking zone. Additionally or in the alternative, in some instances, the vehicle 102 may identify the parking zone 314 and/or the parking location 312 using sensor data generated by one or more sensors of the vehicle 102. The sensor data may include data captured by cameras, lidar, radar, sonar, time-of-flight sensors, and/or other sensors associated with the vehicle. For example, the vehicle 102 when operating in an off-route environment may detect objects 324 based on the sensor data. The vehicle 102 may determine the locations of the objects 324 relative to the vehicle 102 in an inertial coordinate frame.

In various examples, the planning component 104 of the vehicle 102 may periodically determine respective trajectories (e.g., every 0.1 second, 0.2 seconds, 1 second, etc.) while on the vehicle route 310. In such examples, the planning component 104 may periodically determine the lowest cost action and control the vehicle according to the lowest cost action while in the on-route environment. Continuing this example, at a second time, the vehicle 102 may be at a route departure location 316. At the route departure location 316, the planning component 104 may determine an off-route parking trajectory 318 for the vehicle 102 departing the route 310 and proceeding toward the parking location 312. The off-route parking trajectory 318 may be a temporal trajectory in some cases, and the planning component 104 may use a temporal optimization process to determine a cost associated with the off-route parking trajectory 318 (and/or other alternative parking trajectories). The planning component 104 may determine to control the vehicle 102 according to the off-route parking trajectory 318 based on a determination that the associated costs of the off-route parking trajectory 318 are less than one or more alternative parking trajectories.

Based on a determination of a route return location 322, the planning component 104 may generate a route return trajectory 320. For the parking trajectory 318 and/or the route return trajectory 320, the planning component 104 may determine references trajectories, corridors, and/or initial trajectories for with vehicle 102 to travel to and from the parking location 312. In various examples, the planning component 104 may control the vehicle 102 according to the route return trajectory 320 to rejoin the route 310 and travel to the destination. As with the parking trajectory 318, the planning component 104 may periodically determine and/or update the route return trajectory 320 one or more times during the movement of the vehicle 102 to and from the parking location 312.

Figure 4A:
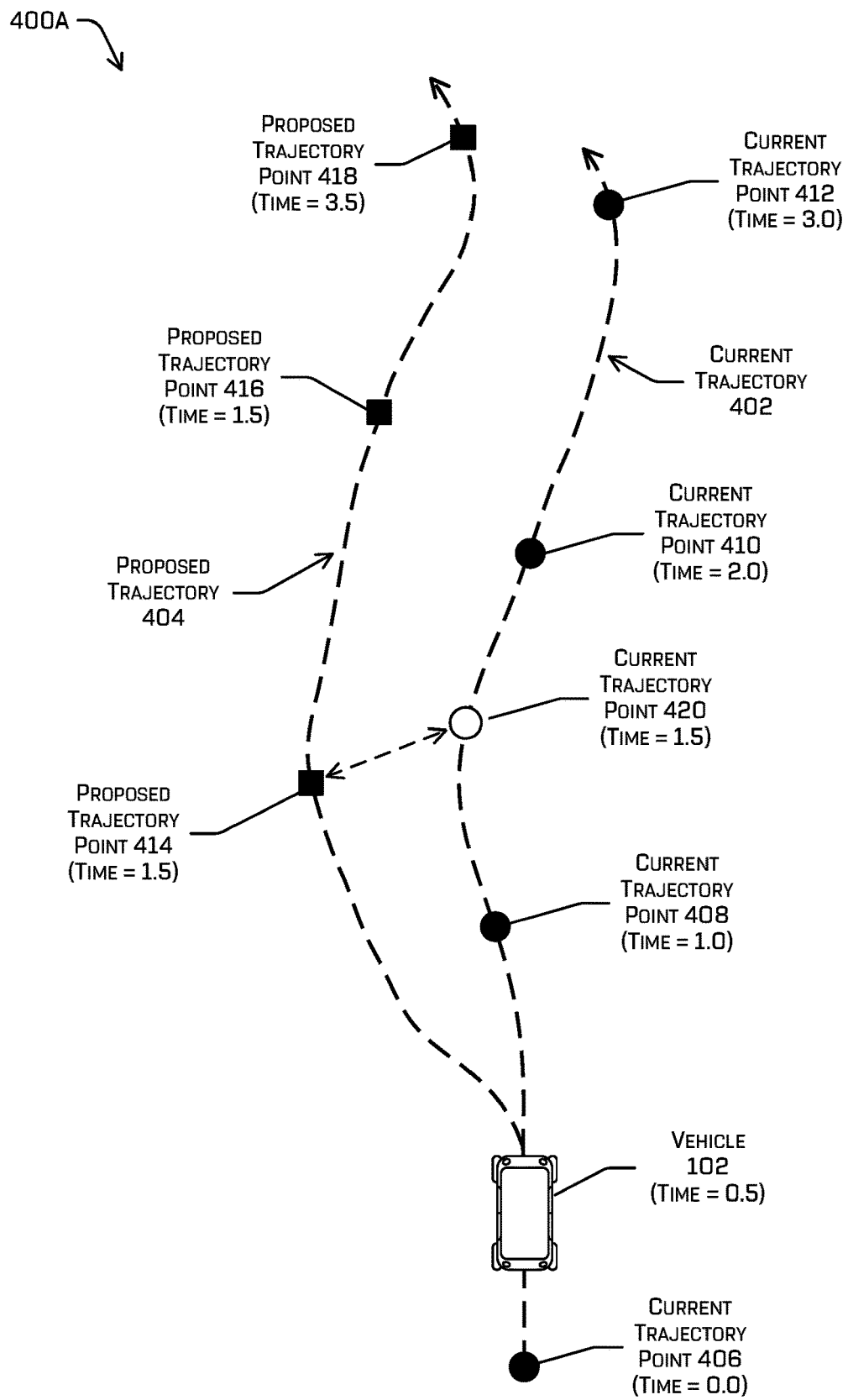
FIGS. 4A and 4B illustrate example techniques of determining and evaluating a proposed trajectory based on temporal resampling of a current trajectory, in accordance with one or more examples of the disclosure.

FIG. 4A depicts an example driving environment 400A including a vehicle 102 configured to generate and/or optimize temporal trajectories, including using resampling of temporally offset trajectories, for traversing through the environment 400A. In some examples, the driving environment 400A may be similar or identical to the environment 100 described above. As shown in this example, the environment 400A depicts a current trajectory 402 and a proposed trajectory 404 for the vehicle 102. As discussed above, the current trajectory 402 and/or the proposed trajectory 404 may be temporal trajectories, each of which may include any number of time points storing vehicle states and/or control commands for maintaining the vehicle on the respective trajectory. In this example, the current trajectory 402 may be generated by the planning component and followed by the vehicle 102 starting at time point 406 (corresponding to Time=0.0 secs). The current trajectory 402 may include any number of additional trajectory points, including time point 408 (corresponding to Time=1.0 secs), time point 410 (corresponding to Time 2.0 secs), and time point 412 (corresponding to Time 3.0 secs). The proposed trajectory 404 may correspond to a second temporal trajectory generated by the planning component 104 at a later time while the vehicle 102 is following the current trajectory 402. In this example, the proposed trajectory 404 may be generated at a time point corresponding to Time=0.5 secs and may include any number of additional trajectory points, including time point 414 (corresponding to Time=1.5 secs), time point 416 (corresponding to Time 2.5 secs), and time point 418 (corresponding to Time 3.5 secs).

Accordingly, as described above, the current trajectory 402 and the proposed trajectory 404 may be temporal trajectories, in which vehicle state data and/or vehicle control data are stored for each time point 406-420. The current trajectory 402 and proposed trajectory 404 may define time sequences for their respective trajectories, including an overall time horizon of the trajectories and/or time step durations of the trajectories. In this example, the current trajectory 402 and proposed trajectory 404 have the same time step durations, but are offset by 0.5 seconds. As noted above, the times associated with the time point 406-420 may be referred to in this example as seconds, but may correspond to any unit of time (e.g., N deciseconds, N centiseconds, etc.).

As shown in this example, at time point 414, the vehicle 102 is following the current trajectory 402. Then, at (or near) time point 414 the planning component 104 may determine the proposed trajectory 404 as a potential alternative trajectory for the vehicle to follow. The planning component 104 may evaluate the proposed trajectory 404 (and one or more other alternative trajectories) to determine a trajectory for the vehicle starting at time point 414. As discussed above, the planning component 104 may execute one or more cost models and/or loss functions, based on vehicle dynamics, constraints, costs, etc., to determine an optimized trajectory at time point 414 (and/or at any other time within the environment 400A).

As discussed above, the evaluation and selection of the proposed trajectory 404 may include determining a trajectory consistency metric between the proposed trajectory 404 and the current trajectory 402. In this example, because the current trajectory 402 and the proposed trajectory 404 are temporal trajectories offset by a time difference (e.g., 0.5 secs), the planning component 104 may resample the current trajectory 402 at one or more time points, based on the time difference between the trajectories. In this example, the planning component 104 may determine a new time point 420 on the spatial and/or temporal path of current trajectory 402 (corresponding to Time=1.5 secs). The planning component 104 may determine vehicle state data and/or vehicle control commands for the new time point 420, for example, using a vehicle model. As discussed above, the planning component 104 may instantiate a vehicle model (e.g., a simulated autonomous vehicle) based on the vehicle 102, and may set an initial state for the vehicle model based on the state of the vehicle 102 at a previous time point within the current trajectory 402. In this example, the planning component 104 set the initial state of the vehicle model to correspond to the vehicle state at time point 408 of the current trajectory (e.g., Time=1.0 secs). The planning component 104 and then may apply the vehicle control commands from time point 408 to the vehicle model, and execute the model until the time of the new time point 420 is reached. When the vehicle model reaches the new time point 420 (e.g., Time=1.5 secs), the vehicle state data and/or vehicle control commands associated with the vehicle model may be stored as the new (e.g., resampled) time point 420 in the current trajectory 402.

After resampling to determine one or more new time points in the current trajectory 402, the planning component 104 may compare the vehicle state data and/or control commands from the new resampled time points to the corresponding time points in the proposed trajectory 404. For instance, the vehicle state data (e.g., position, orientation, speed, velocity, acceleration, etc.) associated with the resampled time point 420 of the current trajectory 402, may be compared to the corresponding vehicle state data associated with the time point 414 in the proposed trajectory. In this example, time point 420 and time point 414 represent the vehicle at the same time (e.g., Time=1.5 secs), and therefore the vehicle state data at these time points may be compared to determine a metric of the consistency of the proposed trajectory 404 relative to the current trajectory 402. After performing temporal optimization to evaluate the costs associated with the proposed trajectory 404, including the degree of trajectory consistency with the current trajectory 402 and/or other cost factors, the planning component 104 may select the proposed trajectory 404 as the new trajectory for the vehicle 102 to follow within the environment. In various examples, the degree of trajectory consistency between a proposed and current trajectory may be used as input to one or more models and/or algorithms, including but not limited to temporal optimization components. The degree of trajectory consistency may be used alone or in combination with other possible cost factors to determine an optimized temporal trajectory for the vehicle at various times/locations while traversing the environment. Examples of other cost factors may include optimizing vehicle dynamics, constraints based on the physical properties of the vehicle and/or environment, optimizing vehicle speed or velocity, minimizing lateral acceleration, optimizing lane positioning, maintaining a minimum safe distance from other objects or potential hazards, etc. When various costs are considered, the trajectory consistency metrics may be weighted differently in different examples. For instance, a greater weighting of the trajectory consistency metrics may result in greater trajectory consistency over time, while lesser weighting may result in less trajectory consistency over time in favor of other cost optimizations. It can be understood that the techniques described herein for generation of temporal trajectories may be applied to routes, reference trajectories, optimized trajectories, and/or any other type of trajectories generated by a vehicle 102.

Figure 4B:
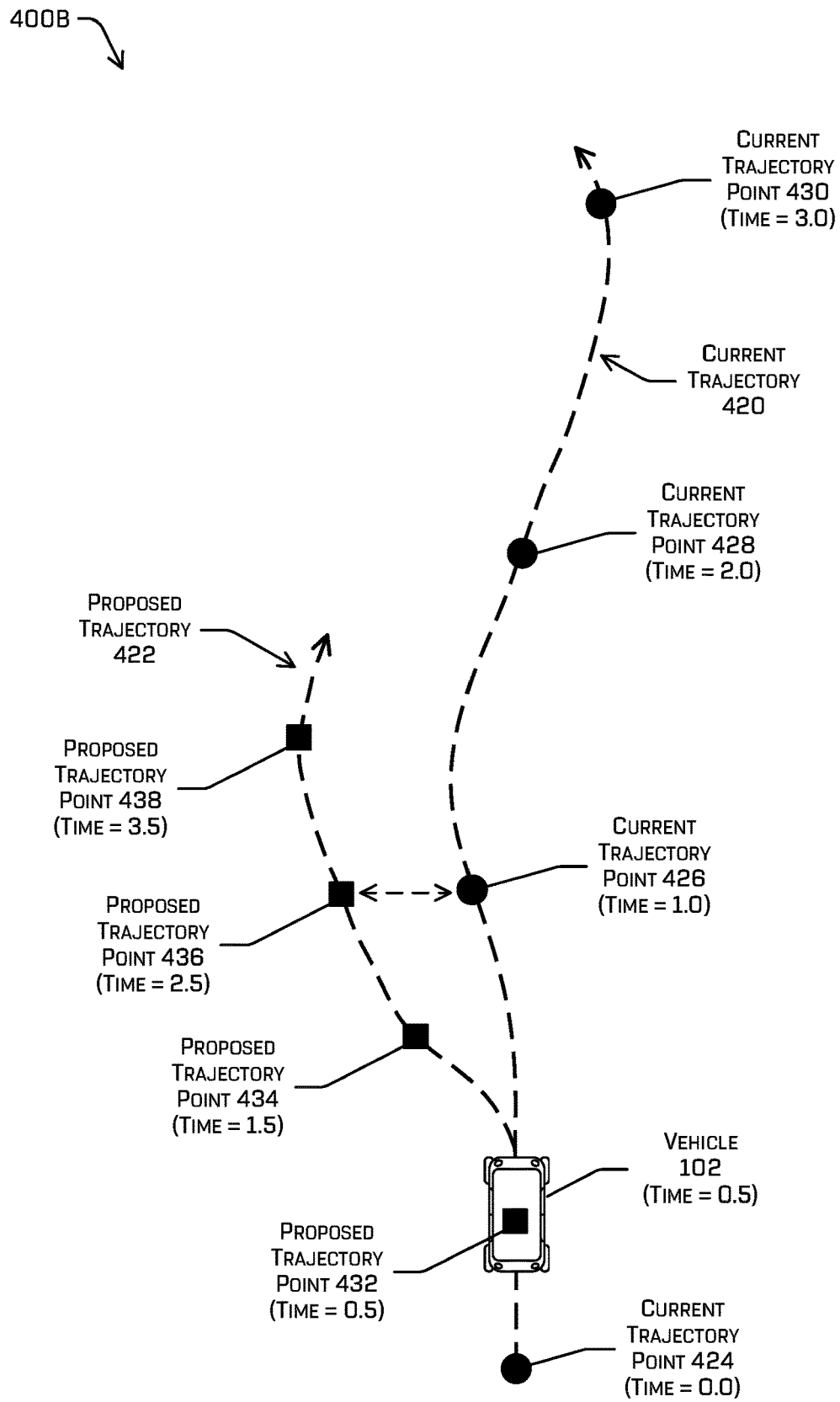

FIG. 4B depicts another example driving environment 400B including a vehicle 102 configured to generate and/or optimize temporal trajectories, including using resampling of temporally offset trajectories, for traversing through the environment 400B. In some examples, the driving environment 400B may be similar or identical to the environment 100 or the driving environment 400A described above. As in the above example, the environment 400B depicts a current trajectory 420 and a proposed trajectory 422 for the vehicle 102. The current trajectory 420 and/or the proposed trajectory 422 may be temporal trajectories, which may include any number of time points storing vehicle states and/or control commands for maintaining the vehicle on the respective trajectory. In this example, the current trajectory 420 may be generated by the planning component and followed by the vehicle 102 starting at time point 424 (corresponding to Time=0.0 secs). The current trajectory 420 may include any number of additional trajectory points, including time point 426 (corresponding to Time=1.0 secs), time point 428 (corresponding to Time 2.0 secs), and time point 430 (corresponding to Time 3.0 secs). The proposed trajectory 422 may correspond to a second temporal trajectory generated by the planning component 104 at a later time while the vehicle 102 is following the current trajectory 420. In this example, the proposed trajectory 422 may be generated at time point 432 (corresponding to Time=0.5 secs) and may include any number of additional trajectory points, including time point 434 (corresponding to Time=1.5 secs), time point 436 (corresponding to Time 2.5 secs), and time point 438 (corresponding to Time 3.5 secs).

In this example, unlike in the above example, the velocity of the vehicle 102 has changed between the time when the current trajectory was generated (e.g., time point 424), and the time when the proposed trajectory was generated (e.g., time point 432). In this example, the vehicle 102 has slowed unexpectedly. As a result, the time sequence of the proposed trajectory 422 has been altered from the time sequence of the current trajectory 420. Due to the lower velocity of the vehicle at time point 432, the time horizon and time step duration of the proposed trajectory 422 may be shorter in distance (assuming the times are kept constant) than the time horizon and time step duration of the current trajectory 420.

Accordingly, in this example, the evaluation and selection of the proposed trajectory 422 may use different resampling techniques for determining the trajectory consistency metric(s) between the proposed trajectory 422 and the current trajectory 420. Due to the differences in the time horizon and time step duration between the current trajectory 420 and the proposed trajectory 422, resampling and comparing vehicle states at corresponding times might not be an effective measurement of trajectory consistency. Instead, one or both of the current trajectory 420 and the proposed trajectory 422 may be analyzed (and/or resampled if necessary) to determine sets of corresponding but different time points between the trajectories. As shown in this example, the time point 426 in the current trajectory 420 may correspond to time point 436 in the proposed trajectory 422, even though the time points represent different times in the different trajectories. In this example, to determine sets of corresponding time points in the different trajectories, the planning component may analyze the vehicle states and/or control commands within the trajectories, and/or may normalize one or both of the trajectories by adjusting their velocities to match. In some cases, the planning component 104 may determine one or more trajectory consistency metrics between the current trajectory 420 and the proposed trajectory 422 without resampling either temporal trajectory, as shown in this example. In other cases, the planning component 104 may resample either or both of the current trajectory 420 and the proposed trajectory 422 to generate new time points for one or both trajectories. As in the above example, sets of corresponding time points from the trajectories can be compared to determine the trajectory consistency metrics. However, in this example, the compared time points include new resampled time points and/or existing time points within the trajectories. Additionally, in this example, the compared time points may correspond to different times based on a change in velocity of the vehicle 102.

FIGS. 5A and 5B depict another example driving environment in which a vehicle 102 may generate an initial trajectory, and then resample the initial trajectory to generate a second trajectory while traversing through the driving environment. In FIG. 5A, the driving environment 500A is shown at a first time and the vehicle 102 is shown at a first position at or near trajectory point 502. At the time shown in FIG. 5A, the vehicle 102 may determine an initial trajectory for performing a driving maneuver within the environment. The first trajectory shown in driving environment 500A includes trajectory points 502A-520A, each of which may include vehicle state data and one or more vehicle control commands to control the vehicle 102 to perform the driving maneuver in the environment.

In FIG. 5B, the driving environment 500B is depicted at a second time after the first time, and the vehicle is depicted at a second location within the driving environment 500B. At the second time shown in driving environment 500B, the vehicle 102 has progressed along a driving path 503B to a second position at or near trajectory point 506B. At the time shown in FIG. 5B, the vehicle 102 may resample the initial trajectory to determine an updated trajectory, as an alternative trajectory for performing the driving maneuver in the environment. In some examples, the initial trajectory shown in driving environment 500A and the updated trajectory shown in driving environment 500B may be temporal trajectories, in which each of the trajectory points 502A-520A and 502B-520 may be associated with a fixed time.

As shown in this example, the vehicle 102 may follow the initial trajectory in environment 500A between trajectory point 502A and trajectory point 506A. Then, when the vehicle 102 is at or near trajectory point 506A, the vehicle may unexpectedly slow down or stop (e.g., in a way that was not anticipated by the initial trajectory shown in environment 500A). For instance, at or near trajectory point 506A, a pedestrian or other object may impede the path of the vehicle 102, causing it to temporarily slow down or stop. When this occurs, the planning component 104 may determine that the initial trajectory shown in environment 500A may no longer be feasible, because the vehicle 102 cannot feasibly or safely reach the vehicle state(s) of the next trajectory point(s) (e.g., trajectory point 508A) by the fixed times associated with those trajectory points. As a result, the planning component 104 may determine, at or near trajectory point 506A, to determine an updated trajectory by resampling the initial trajectory.

In the updated trajectory shown in FIG. 5B, the trajectory points 502B-506B may be similar or identical to the trajectory points 502A-506A in the initial trajectory. However, the trajectory points 508B-520B may be resampled trajectory points. As described above, the planning component 104 may resample one or more new trajectory points 508B-520B based on the initial trajectory. In some examples, at each time associated with a new trajectory point 508B-520B, the planning component 104 may initiate a vehicle model and/or vehicle simulation based on the vehicle 102, and execute the model/simulation based on the vehicle states and vehicle control commands of the initial trajectory, to determine the vehicle states and vehicle control commands for the new trajectory points 508B-520B. As a result of the vehicle slowing or stopping at or near trajectory points 506B, it can be seen in this example that the temporal trajectory points 508B-516B are closer together than trajectory points 508A-516A, indicating lower vehicle speeds during that portion of the updated trajectory. However, in order to complete the same driving maneuver as the initial trajectory within the same period, the updated trajectory may increase the vehicle speed between trajectory points 516B-520B, to allow the vehicle 102 to reach trajectory point 520B at the same time associated with trajectory point 520A. Therefore, although the vehicle velocities may vary between different portions of the initial trajectory shown in FIG. 5A and the updated trajectory shown in FIG. 5B, it may be seen in this example that the lateral profile of the initial trajectory and the updated trajectory may be the same.

In described above, the examples shown in FIGS. 5A and 5B may represent a scenario in which a vehicle 102 following an initial trajectory slows down unexpectedly, causing the planning component 104 to resample the initial trajectory and determine an updated trajectory to complete the same (e.g., off-route) driving maneuver. Further, in this example, the updated trajectory is determined as a trajectory to perform the driving maneuver in the same time period and having the same lateral profile. It can be understood that in other examples, similar or identical techniques may be used to resample an initial trajectory and determine an updated trajectory for the vehicle 102, in response to the vehicle 102 unexpectedly speeding up, or in response to the vehicle 102 unexpectedly steering/swerving while following the initial trajectory.

Figure 6:
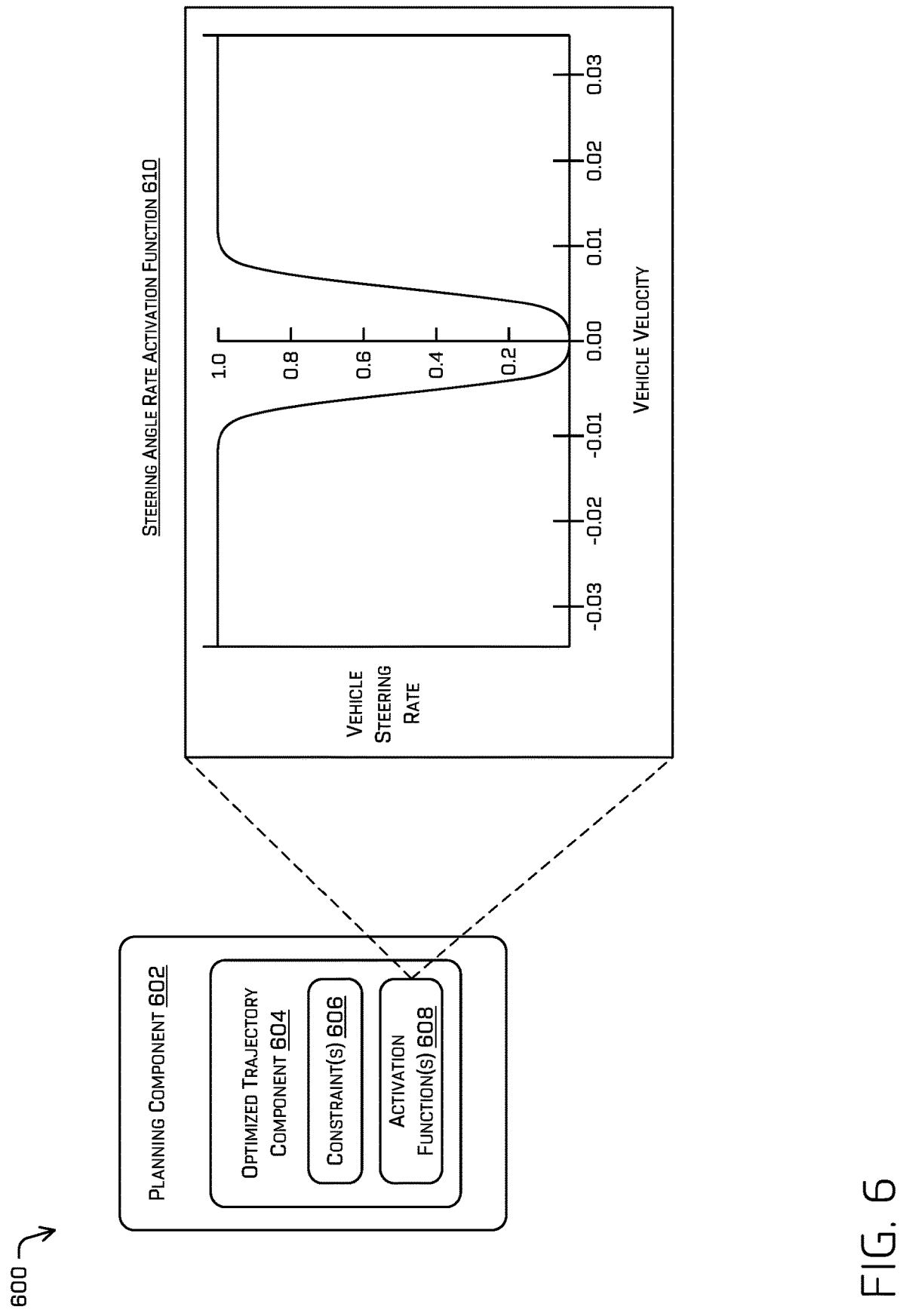
FIG. 6 illustrates an example technique of applying a trajectory constraint using an activation function, during temporal optimization of a proposed trajectory, in accordance with one or more examples of the disclosure.

FIG. 6 is a diagram 600 illustrating an example technique of applying a trajectory constraint using a velocity-based steering angle rate activation function, during a temporal optimization of a proposed trajectory. As shown in this example, a planning component 602 may include an optimized trajectory component 604 configured to generate an optimized trajectory based on a reference trajectory. As noted above, in some cases temporal trajectory optimization may include applying constraints (e.g., steering and/or velocity constraints) or other restrictions (e.g., steering angle restrictions), to control or restrict the driving actions that may occur within a temporal trajectory. To apply such constraints and/or determine compliance with such restrictions, the optimized trajectory component 604 in this example may include a constraints component 606 and/or an activation function component 608. The constraints component 606 may be configured to implement one or more hard constraints during the temporal optimization of a trajectory. A hard constraint may include, for example, a state-dependent constraint on steering, acceleration, and/or any other vehicle control command. For instance, a hard constraint may be applied by the constraints component 606 to prevent the vehicle 102 from performing a dry steering action (e.g., changing the steering rate while the vehicle is stopped) that might otherwise be the result of a cost-based temporal optimization of a trajectory. Another example of a hard constraint enforced by the constraints component 606 may include a steering rate threshold associated with a velocity of the vehicle 102, to prevent the vehicle 102 from performing sharp turns at high speeds.

Additionally or alternatively to the constraints component 606, the planning component may use the activation function component 608 to enforce vehicle control constraints and/or restrictions. As discussed above, hard constraints may be difficult to implement and/or incompatible with the loss functions and/or cost models of the optimized trajectory component 604 in some cases. For instance, when a cost-based temporal trajectory optimization process does not support state-dependent constraints on dry steering, sharp turns at high velocities, etc., then the activation function component 608 may implement one or more steering angle rate activation functions to perform the constraints or restrictions. In this case, the steering angle rate activation function 610 may output a numeric value (e.g., 0.0 to 1.0) based on the current velocity of the vehicle 102. As an example, the steering angle rate activation function 610 may be defined by the following equation:

$$f(v)=1-e^{-av^2} \quad (1)$$

where a=2.5 e4.

As shown in this example, the steering angle rate activation function 610 may evaluate to zero (0) when the vehicle 102 is stationary, and may ramp up quickly to one (1) when the vehicle is considered to be moving. In this example, the planning component 602 may use the steering angle rate activation function 610 to determine a next steering angle within a temporal trajectory. For instance, the planning component 602 may determine the magnitude of the next steering angle as the magnitude of the current steering angle (e.g., at the previous time point in the trajectory), plus the product of the steering angle rate, the duration of time, and the output of the steering angle rate activation function 610 (e.g., 0 or 1). The steering angle rate activation function 610 in this example may thus prevent dry steering maneuvers without using a state-dependent constraint, and other activation functions may be implemented to prevent other restricted vehicle actions.

Figure 7:
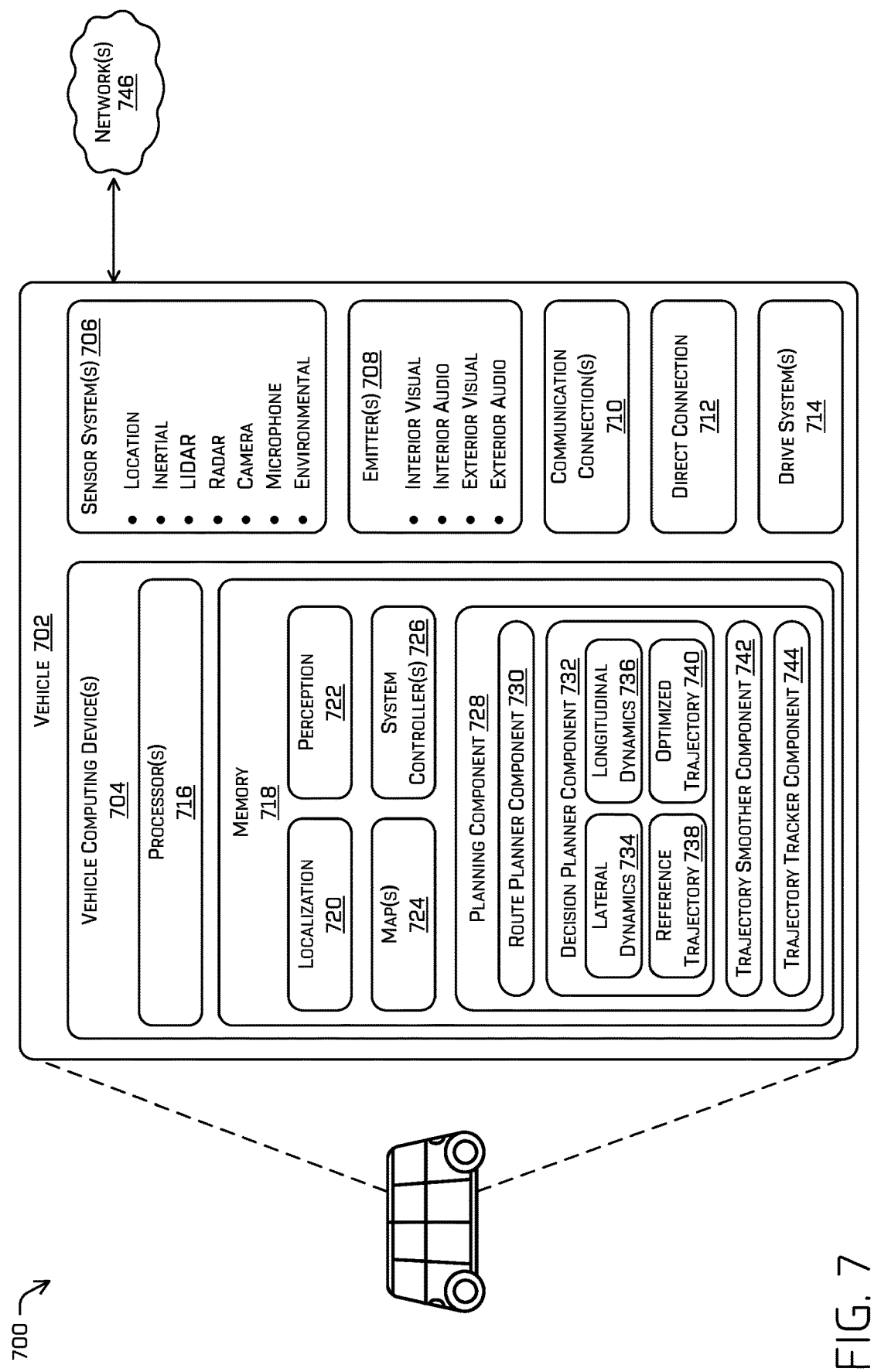
FIG. 7 depicts a block diagram of an example system for implementing various techniques described herein.

FIG. 7 depicts a block diagram of an example system 700 for implementing the techniques described herein. In at least one example, the system 700 can include a vehicle 707, which can correspond to the vehicle 102 in FIGS. 1-6.

In some instances, the vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 702 can include a vehicle computing device 704, one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle (e.g., a robotic platform). In the illustrated example, the memory 718 of the vehicle computing device 704 stores a localization component 720, a perception component 722, one or more maps 724, one or more system controllers 726, and planning component 728 including a route planner component 730, a decision planner component 732 including a lateral dynamics component 734, a longitudinal dynamics component 736, a reference trajectory component 738, and an optimized trajectory component 740, a trajectory smoother component 742, and a trajectory tracker component 744. Though depicted in FIG. 7 as residing in the memory 718 for illustrative purposes, it is contemplated that the localization component 720, the perception component 722, the one or more maps 724, the one or more system controllers 726, the planning component 728, the route planner component 730, the decision planner component 732, the lateral dynamics component 734, the longitudinal dynamics component 736, the reference trajectory component 738, the optimized trajectory component 740, the trajectory smoother component 742, and/or the trajectory tracker component 744 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining to load map data into memory, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like); etc. In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 724 can include at least one map (e.g., images and/or a mesh). In some examples, the vehicle 702 can be controlled based at least in part on the maps 724. That is, the maps 724 can be used in connection with the localization component 720, the perception component 722, and/or the planning component 728 to determine a location of the vehicle 702, identify objects in an environment, and/or generate routes and/or trajectories to navigate within an environment.

In some examples, the one or more maps 724 can be stored on a remote computing device(s) accessible via network(s) 746. In some examples, multiple maps 724 can be stored based on, for example, a characteristic (e.g., type of entity, time of day, day of week, season of the year, etc.). Storing multiple maps 724 can have similar memory requirements, but increase the speed at which data in a map can be accessed.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

In general, the planning component 728 can determine a path for the vehicle 702 to follow to traverse through an environment. As discussed above, the planning component 728 can include the route planner component 730, the decision planner component 732 including the lateral dynamics component 734, the longitudinal dynamics component 736, the reference trajectory component 738, and the optimized trajectory component 740, the trajectory smoother component 742, and the trajectory tracker component 744. Using these components, the planning component 728 may determine time-discretized (or temporal) trajectories for the vehicle 702 to follow, including evaluating proposed temporal trajectories and determining/selecting optimized temporal trajectories as the vehicle 702 traverses an environment.

In some instances, the route planner component 730 can be configured to determine a most efficient route to travel from a first location (e.g., a current location) to a second location (e.g., a target location). For the purpose of this discussion, a route can be a sequence of waypoints for travelling between two locations. As described above, the current location and/or the target location for the vehicle 702 can include locations within a route-based reference frame or "off-route" locations outside of a route-based reference frame (e.g., parking spots, passenger drop-off or pick-up locations, etc.). As non-limiting examples, waypoints include streets, intersections, global positioning system (GPS) coordinates, etc. In at least one example, the route planner component 730 can perform a search, such as a graph search, on top of a map to identify a route to guide the autonomous vehicle from a first location to a second location. In at least one example, the route planner component 730 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planner component 730 can identify two or more candidate routes for guiding the autonomous vehicle 702 from the first location to the second location. In such examples, the route planner component 730 can rank the two or more candidate routes based on route planning constraint(s). Route planning constraint(s) can include rules of the road, travel time, travel distance, etc. In at least one example, the route planner component 730 can determine that a top-ranking candidate route is the route for guiding the autonomous vehicle 702 from the first location to the second location. The route planner component 730 can output a sequence of waypoints corresponding to the route to the decision planner component 732.

In general, and in some instances, the decision planner component 732 can receive the route (e.g., the sequence of waypoints) and can generate an instruction for guiding the autonomous vehicle 702 along at least a portion of the route from the first location to the second location. In at least one example, the decision planner component 732 can determine how to guide the autonomous vehicle 702 from a first waypoint in the sequence of waypoints to a second waypoint in the sequence of waypoints. In some examples, the instruction can be a trajectory, or a portion of a trajectory. As discussed above, the trajectories can be temporal trajectories including a sequence of vehicle states, control commands, etc., associated with different times in time sequence. For example, the decision planner component 732 can generate a sequence of vehicle control commands (or actions) (e.g., drive down the road, accelerate, change lanes, turn left, etc.) to guide the autonomous vehicle 702 along the route. In some cases, the decision planner component 732 can generate various actions in the alternative. In other examples, the instruction can be a policy. A policy can be used to determine a trajectory of the autonomous vehicle 702 based on real-time processed sensor data received from sensor(s) on the autonomous vehicle 702.

Further, the decision planner component 732 can include the lateral dynamics component 734, the longitudinal dynamics component 736, the reference trajectory component 738, and the optimized trajectory component 740.

In some instances, the lateral dynamics component 734 can be used to define lateral dynamics (e.g., a steering angle) of the vehicle 702, as shown in the following equations.

For illustrative purposes, the i-th frame (or i-th step in time) can be denoted by $g_i \in SE(2)$ (e.g., when represented in two dimensions a set of the special Euclidian group 2 comprising a translation in <x, y> and a rotation about some heading angle), while the relative as $$\bar{g}_i = g_i^{-1} g_{i+1}. \text{ Let: } \bar{g} = \begin{pmatrix} \bar{R} & \bar{p} \\ 0 & 1 \end{pmatrix}, \text{ where } \bar{R} \in SO \quad (2)$$

is the relative rotation (corresponding to angle $\bar{\theta}$) and $\bar{p} \in \mathbb{R}^2$ is the relative translation. The end-point of the arc corresponding to the system motion with curvature resulting in heading error $e_{\theta_{i+1}}$ then takes the form:

$$p_i(e_{\theta_{i+1}}) = \frac{1}{\kappa_i} \begin{pmatrix} \sin(e_{\theta_{i+1}} + \bar{\theta}_i) - \sin e_{\theta_i} \\ \cos e - \cos(e_{\theta_{i+1}} + \bar{\theta}_i) + e_{y_i} \kappa_i \end{pmatrix} \quad (2)$$

expressed in the reference frame $g_i$.

In some instances, the integrator update step is equivalent to finding $(e_{\theta_{i+1}}, e_{y_{i+1}})$ which satisfy:

$$pi(e_{\theta_{i+1}}) = \bar{p}i + e_{y_{i+1}} \bar{r}i \quad (3)$$

where $$\bar{r}_i = \bar{R}_i \begin{pmatrix} 0 \\ 1 \end{pmatrix}$$

is the lateral unit vector of the relative reference rotation defined by $$\begin{bmatrix} \cos(\bar{\theta}) & -\sin(\bar{\theta}) \\ \sin(\bar{\theta}) & \cos(\bar{\theta}) \end{bmatrix}.$$

In some instances, the two equations with two unknowns can be solved exactly. First, the relationship in equation (10) can be expressed as:

$$\begin{pmatrix} \sin(e_{\theta_{i+1}} + \bar{\theta}_i) \\ -\cos(e_{\theta_{i+1}} + \bar{\theta}_i) \end{pmatrix} = \begin{pmatrix} \sin(e_{\theta_i}) \\ -\cos(e_{\theta_i}) \end{pmatrix} + \kappa_i \begin{bmatrix} -\begin{pmatrix} 0 \\ e_{y_i} \end{pmatrix} + \bar{p}_i + e_{y_{i+1}} \bar{r}_i \end{bmatrix}, \quad (4)$$

and after taking the squared norm of each side and dividing by the curvature $\kappa_i$, the dependence on $e_{\theta_{i+1}}$ can temporarily be removed to and solved for the unknown $e_{y_{i+1}}$ as the root of the quadratic equation:

$$2a_i^T b_i + \kappa_i \|b_i\|^2 + 2(a_i + \kappa_i b_i)^T \bar{r}_i e_{y_{i+1}} + k_i e_{y_{i+1}}^2 = 0,$$

where $$a_i = \begin{pmatrix} \sin(e_{\theta_i}) \\ -\cos(e_{\theta_i}) \end{pmatrix} \text{ and } b_i = -\begin{pmatrix} 0 \\ e_{y_i} \end{pmatrix} + \bar{p}_i.$$

From the two roots, in some instances, the root that is closer to the previous offset $e_{y_i}$ can be selected. However, in some instances, the root that is further from the previous offset $e_{y_i}$ can be selected as well, or any combination thereof. Afterwards, the second unknown $e_{\theta_{i+1}}$ can be found using a tan 2 applied to the right-hand-side of equation (11). In examples where the curvature is near zero, the solution reduces to:

$$e_{y_{i+1}} = -\frac{a_i^T b_i}{a_i^T \bar{r}_i} \tag{5}$$

In some instances, in order to be able to project onto the reference next frame, only a subset of curvatures can be allowed. That subset of allowed curvatures can be given by $\kappa_i \in [\kappa_i^-, \kappa_i^+]$, where $\kappa_i^\pm$ are the minimum and maximum roots of the quadratic equation:

$$(a^T \bar{r})^2 + 2(a^T \bar{r} b^T \bar{r} - a^T b)\kappa + [(b^T \bar{r})^2 - \|b\|^2]\kappa^2) = 0 \tag{6}$$

In some instances, the longitudinal dynamics component 736 can be used to define longitudinal dynamics (e.g., an acceleration) of the vehicle 702.

In some instances, the longitudinal dynamics corresponds to computing the travelled arc-length:

$$\Delta l_i = \begin{cases} \dfrac{e_{\theta_{i+1}} + \bar{\theta}_i - e_{\theta_i}}{\kappa_i} & \text{for } \kappa_i \neq 0 \\ \|\bar{P}_i + e_{y_{i+1}} \bar{r}_i\| & \text{otherwise} \end{cases} \tag{7}$$

and then updating the velocity in closed form:

$$v_{i+1} = \sqrt{v_i^2 + 2a \Delta l_i} \tag{8}$$

In some instances, the reference trajectory component 738 can be configured to generate an "ideal" route based at least in part on the route provided by the route planner component 730. The reference trajectory component 738, which may be a temporal trajectory, can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 738 and/or can be received from an external computing device (e.g., from a teleoperations center) via the network(s) 746.

In some instances, the optimized trajectory component 740 can perform an optimization based on a reference trajectory to generate an optimized trajectory. In various examples, a reference trajectory, an optimized trajectory, or both the reference trajectory and the optimized trajectory may be temporal trajectories. In some instances, the optimized trajectory component 740 can use a projected stagewise Newton method to evaluate a plurality of loss functions to generate the optimized trajectory. For example, the following loss functions can be used:

$$L_i^{ref}(x, u) = \frac{1}{2}\|x - \bar{x}_i\|_{Q_i}^2 + \frac{1}{2}\|u - \bar{u}_i\|_{R_i}^2 \tag{9}$$

$$L_N^{ref}(x) = \frac{1}{2}\|x - x_N\|_{Q_N}^2 \tag{10}$$

$$L_i^{env}(x) = \frac{w_{e_y}}{2}\left([e_y - e_{y_i}^+ - \epsilon_{e_y}]_{>0}^2 + [e_y - e_{y_i}^- + \epsilon_{e_y}]_{<0}^2\right) \tag{11}$$

$$L_i^{lat}(x, u) = \frac{w_k}{2}\left(\frac{k_d - \kappa}{\Delta t_{ref}}\right)^2 + L_i^{env}(x) \tag{12}$$

$$L_i^{lon}(x, u) = \frac{w_a}{2}\left(\frac{a_d - a}{\Delta t_{ref}}\right)^2 + \frac{w_v}{2}\left([v - v_i^+ - \epsilon_v]_{>0}^2\right) \tag{13}$$

In some examples, equation (9) corresponds to a loss function based at least in part on a distance between the autonomous vehicle and a corresponding point associated with the reference trajectory.

In some examples, equation (10) corresponds to the distance between the autonomous vehicle and the reference trajectory at the last point (or n-th point) on the reference trajectory.

In some examples, equation (11) corresponds to a loss function based at least in part on a distance between the autonomous vehicle and an object in the environment. In some examples, the variable $w_{e_y}$ corresponds to a weight associated with the lateral offset. In some examples, the variables $e_{y_i}^+$ and $e_{y_i}^-$ correspond to desired lateral offsets. In some examples, the variable $\epsilon_{e_y}$ represents a lateral offset margin.

In some examples, equation (12) corresponds to a loss function or a fourth loss function based at least in part on the plurality of curvature values associated with the reference curvature and desired curvatures.

In some examples, equation (13) corresponds to a loss function based at least in part on the plurality of target velocities or longitudinal acceleration of the autonomous vehicle. In some examples, the variable $w_a$ corresponds to a weight associated with a lateral acceleration, and the variable $w_v$ corresponds to a weight associated with a lateral velocity. In some examples, the variable $\epsilon_v$ corresponds to a velocity margin.

Additional loss functions can be based at least in part on one or more of lateral acceleration, curvature(s), comfort, trip duration, and the like. As can be understood, one or more loss functions can be based on some or all of the loss functions discussed herein, but is not limited to the loss functions discussed herein.

In some instances, the above-listed loss functions can be evaluated together to determine the complete costs associated with an optimized trajectory as:

$$L_i(x,u) = L_i^{ref}(x,u) + L_i^{lat}(x,u) + L_i^{lon}(x,u) \tag{14}$$

$$L_N(x,u) = L_N^{ref}(x,u) + L_i^{env}(x) \tag{15}$$

In some instances, the trajectory smoother component 742 can include functionality to receive an instruction (e.g., from the decision planner component 732) and optimize the instruction based on objects identified in the environment. In at least one example, the trajectory smoother component 742 can access, receive, and/or determine real-time processed sensor data to determine object(s) in the environment which the autonomous vehicle 702 is travelling. In the at least one example, the trajectory smoother component 742 can process the instruction in view of the real-time processed sensor data.

In an example where the instruction is a trajectory, the trajectory smoother component 742 can leverage model(s) and/or algorithm(s), constraint(s), and/or cost(s) to optimize the trajectory. For instance, the trajectory smoother component 742 can utilize model(s) and/or algorithm(s) including, but not limited to, differential dynamic programming, interior point optimization, sequential quadratic programming, etc. to refine the trajectory. In at least one example, the constraint(s) can include, but are not limited to, geometry and/or physical properties of the vehicle and/or environment, etc. In at least one example, the cost(s) can include, but are not limited to, performance (e.g., speed), minimizing lateral acceleration, distance from other objects, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory smoother component 742 can generate an output trajectory.

In an example where the instruction is a policy, the trajectory smoother component 742 can leverage model(s) and/or algorithm(s), constraint(s), and/or cost(s) to generate a trajectory based on the policy and real-time processed sensor data. For instance, the trajectory smoother component 742 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory smoother component 742 can access, receive, and/or determine real-time processed sensor data. The trajectory smoother component 742 can leverage the real-time processed sensor data to generate an output trajectory. The trajectory smoother component 742 can utilize a more detailed model of the autonomous vehicle than the decision planner component 732. Processing that utilizes such a detailed model can be computationally expensive. Additionally, the trajectory smoother component 742 can output an output trajectory within a predetermined amount of time after receiving the real-time processed sensor data. For instance, in at least one example, the trajectory smoother component 742 can receive an interrupt requesting an output trajectory and the trajectory smoother component 742 can provide an output trajectory responsive to receiving the interrupt.

In some instances, the trajectory tracker component 744 can include functionality to receive an output trajectory from the trajectory smoother component 742 and can compute commands for actuating steering and acceleration of the autonomous vehicle 702 to enable the autonomous vehicle 702 to follow the output trajectory. In at least one example, the trajectory tracker component 744 can receive the output trajectory and can compute a steering angle and velocity to enable the autonomous vehicle 702 to follow the output trajectory. In some examples, the trajectory tracker component 744 can include a separate vehicle controller configured to control steering, propulsion, braking, safety, emitters, communication, and other systems of the vehicle.

In some instances, the planning component 728 can include a prediction component to generate predicted trajectories of objects in an environment. For example, a prediction component can generate one or more predicted trajectories for vehicles, pedestrians, animals, and the like within a threshold distance from the vehicle 702. In some instances, a prediction component can measure a trace of an object and generate a trajectory for the object based on observed and predicted behavior.

As can be understood, the components discussed herein (e.g., the localization component 720, the perception component 722, the one or more maps 724, the one or more system controllers 726, the planning component 728, the route planner component 730, the decision planner component 732, the lateral dynamics component 734, the longitudinal dynamics component 736, the reference trajectory component 738, the optimized trajectory component 740, the trajectory smoother component 742, and the trajectory tracker component 744) are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 718 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 706 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704. Additionally or alternatively, the sensor system(s) 706 can send sensor data, via the one or more networks 746, to the one or more computing device(s) at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 746. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the one or more maps 724, the one or more system controllers 726, the planning component 728, the route planner component 730, the decision planner component 732, the lateral dynamics component 734, the longitudinal dynamics component 736, the reference trajectory component 738, the optimized trajectory component 740, the trajectory smoother component 742, and the trajectory tracker component 744 can process sensor data, as described above, and can send their respective outputs, over the one or more network(s) 746, to one or more computing device(s). In at least one example, the aforementioned components can send their respective outputs to the one or more computing device(s) at a particular frequency, after a lapse of a predetermined period of time, in near real-time, etc.

In some examples, the vehicle 702 can send sensor data to one or more computing device(s) via the network(s) 746. In some examples, the vehicle 702 can send raw sensor data to the computing device(s). In other examples, the vehicle 702 can send processed sensor data and/or representations of sensor data to the computing device(s). In some examples, the vehicle 702 can send sensor data to the computing device(s) at a particular frequency, after a lapse of a predetermined period of time, in near real-time, etc. In some cases, the vehicle 702 can send sensor data (raw or processed) to the computing device(s) as one or more log files.

The processor(s) 716 of the vehicle 702 can be any suitable processor capable of executing instructions to process data and perform operations as described herein. By way of example and not limitation, the processor(s) 716 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 is an example of non-transitory computer-readable media. The memory 718 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 718 can include at least a working memory and a storage memory. For example, the working memory may be a high-speed memory of limited capacity (e.g., cache memory) that is used for storing data to be operated on by the processor(s) 716. In some instances, the memory 718 can include a storage memory that may be a lower-speed memory of relatively large capacity that is used for long-term storage of data. In some cases, the processor(s) 716 cannot operate directly on data that is stored in the storage memory, and data may need to be loaded into a working memory for performing operations based on the data, as discussed herein.

Figure 8:
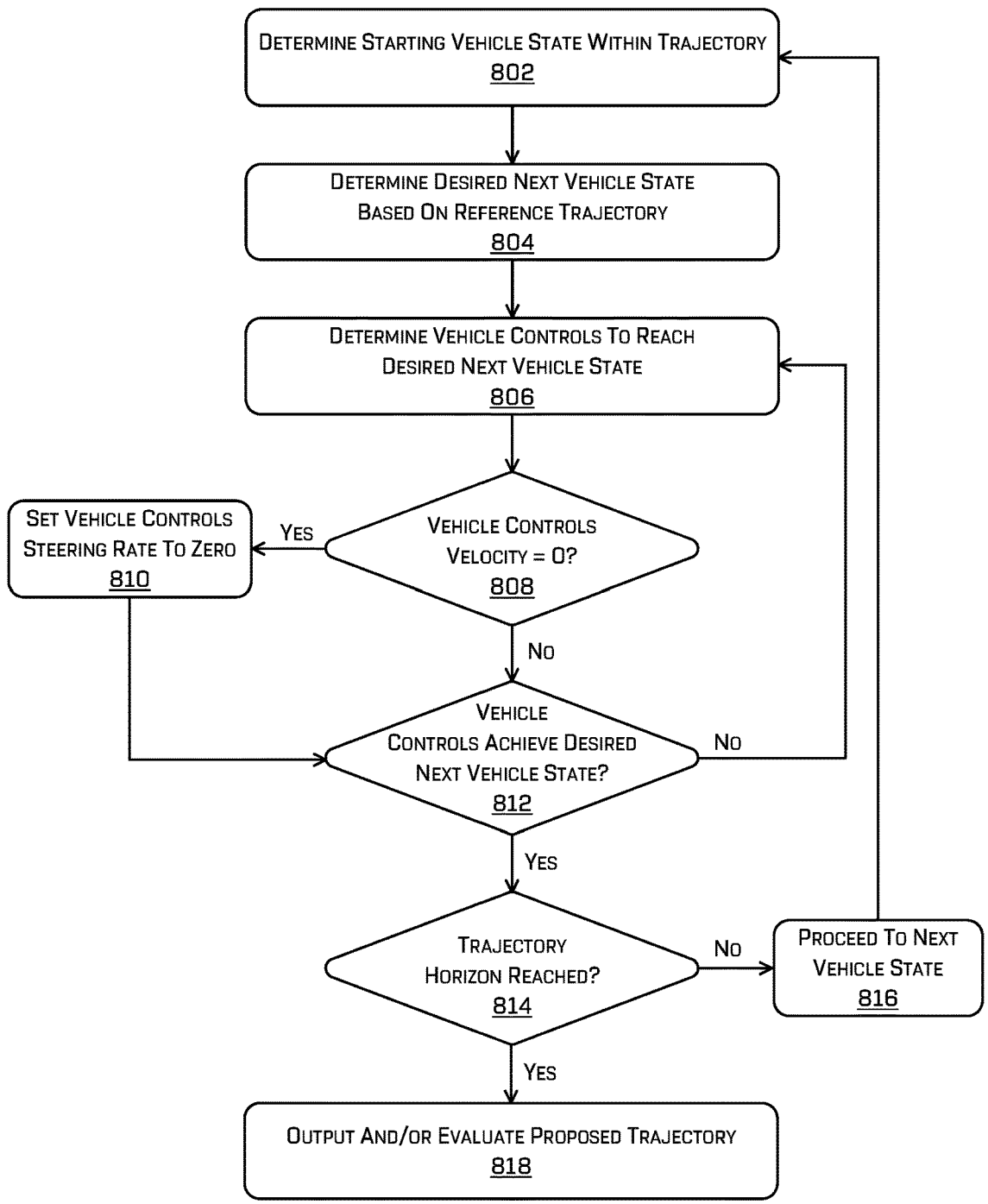
FIG. 8 is a flow diagram illustrating an example process of generating a proposed trajectory for an autonomous vehicle, including applying a trajectory constraint, in accordance with one or more examples of the disclosure

FIG. 8 is a flow diagram illustrating an example process 800 of generating a proposed trajectory for an autonomous vehicle, including applying a trajectory constraint. As described below, the operations in process 800 may be performed by an autonomous vehicle including a planning component. For instance, process 800 may be performed by the planning component 104 and/or the planning component 602, operating within an autonomous vehicle (e.g., vehicle 102). As described below, the planning component in this example may include an optimized trajectory component including one or more constraint components (e.g., constraints component 606 and/or an activation function component 608) configured to apply trajectory constraints when optimizing temporal trajectories.

At operation 802, the planning component 104 may determine a starting (or current) state of a vehicle 102 within a driving environment. The starting/current state determined in operation 802 may represent a starting point of a vehicle 102 before beginning to navigate within an environment, or may represent any point while the vehicle 102 is following an existing trajectory (e.g., a reference trajectory or optimized trajectory) tracking a driving route. As described above, the vehicle state data may be stored associated with a particular time point in a temporal trajectory and/or a particular spatial point in a spatial trajectory.

At operation 804, the planning component 104 may determine a desired next vehicle state, after the starting/current state of the vehicle 102, based on a reference trajectory associated with a vehicle route. As discussed above, reference trajectory may correspond to an ideal route based at least in part on the route provided by a route planner component. The trajectory (e.g., a temporal reference trajectory) may include a series of time-discretized vehicle states, each of which may be associated with a particular time step in a sequence of times starting at the current time. In this example, the planning component 104 may retrieve a next vehicle state in the time sequence for the reference trajectory. The vehicle state data associated with the desired next vehicle state may include, for example, a desired vehicle position, orientation, velocity, and/or acceleration for the vehicle 102 at the next associated time point.

At operation 806, the planning component 104 may determine one or more vehicle controls commands that may be executed on the vehicle 102 to move the vehicle 102 from the starting/current state to the desired next vehicle state. Vehicle control commands may include data representing signals configured to drive the actuators of the vehicle to perform certain driving actions, such as braking, steering, acceleration, etc. Such control commands may include time-based commands (e.g., steer at angle X for 0.5 secs, accelerate at rate Y from 1.2 secs, etc.) or may be spatial commands (e.g., drive at N m/s for 180 meters, etc.). As described above, determining the vehicle controls to reach a next desired vehicle state in a trajectory may include executing one or more models or algorithms (e.g., a cost model, loss function, etc.) to determine an optimal (e.g., best-guess) set of vehicle controls. In various examples, a model or algorithm may include a base lateral and longitudinal dynamics of the vehicle 102, the model and specifications of the vehicle 102, the environment and driving conditions, etc.

At operation 808, the planning component 104 may determine whether or not the vehicle controls determined in operation 806 include any zero-velocity driving actions (e.g., stopping and/or reversing the vehicle 102). When the temporal optimization operation includes a stationary driving state (808:Yes), then at operation 810 the planning component 104 may set the steering rate of the vehicle 102 to zero at any times when the vehicle 102 is stationary.

At operation 812, the planning component 104 may determine whether or not the vehicle controls determined in operation 806 may be successful in moving the vehicle 102 from the current/starting state to the desired next vehicle state. As described above, the planning component 104 may use an integrator and/or other techniques (e.g., vehicle models, simulated vehicles, etc.) to simulate the execution of the vehicle controls at the current vehicle state, and to calculate the resulting vehicle state at the next time point of the trajectory. When vehicle controls determined in operation 806 are not likely to be successful in moving the vehicle 102 from the current/starting state to the desired next vehicle state (812:No), then process 800 may return to operation 806 to determine an alternative set of vehicle controls for reaching the desired next vehicle state.

At operation 814, the planning component 104 may determine whether the trajectory horizon has been reached for the trajectory being generated and/or optimized. As noted above, a horizon may represent the terminus point of a trajectory, which may be a destination of the vehicle 102 and/or an intermediate state on the way to a destination. Trajectory horizons may include spatial and/or time horizons, and may be determined based on map data and/or the perception range of the sensors of the vehicle 102. When the trajectory horizon has not yet been reached for the generated/optimized trajectory (814:No), then process 800 may proceed to the next vehicle state of the trajectory at operation 816, and then return to operation 802 to continue the trajectory generated/optimized operations for the remaining portions of the trajectory. In contrast, when the trajectory horizon has been reached for the generated/optimized trajectory (814:Yes), then process 800 may proceed to operation 818 in which the generated/optimized trajectory may be output by the planning component 104 as a potential optimized trajectory for the vehicle 102.

Figure 9:
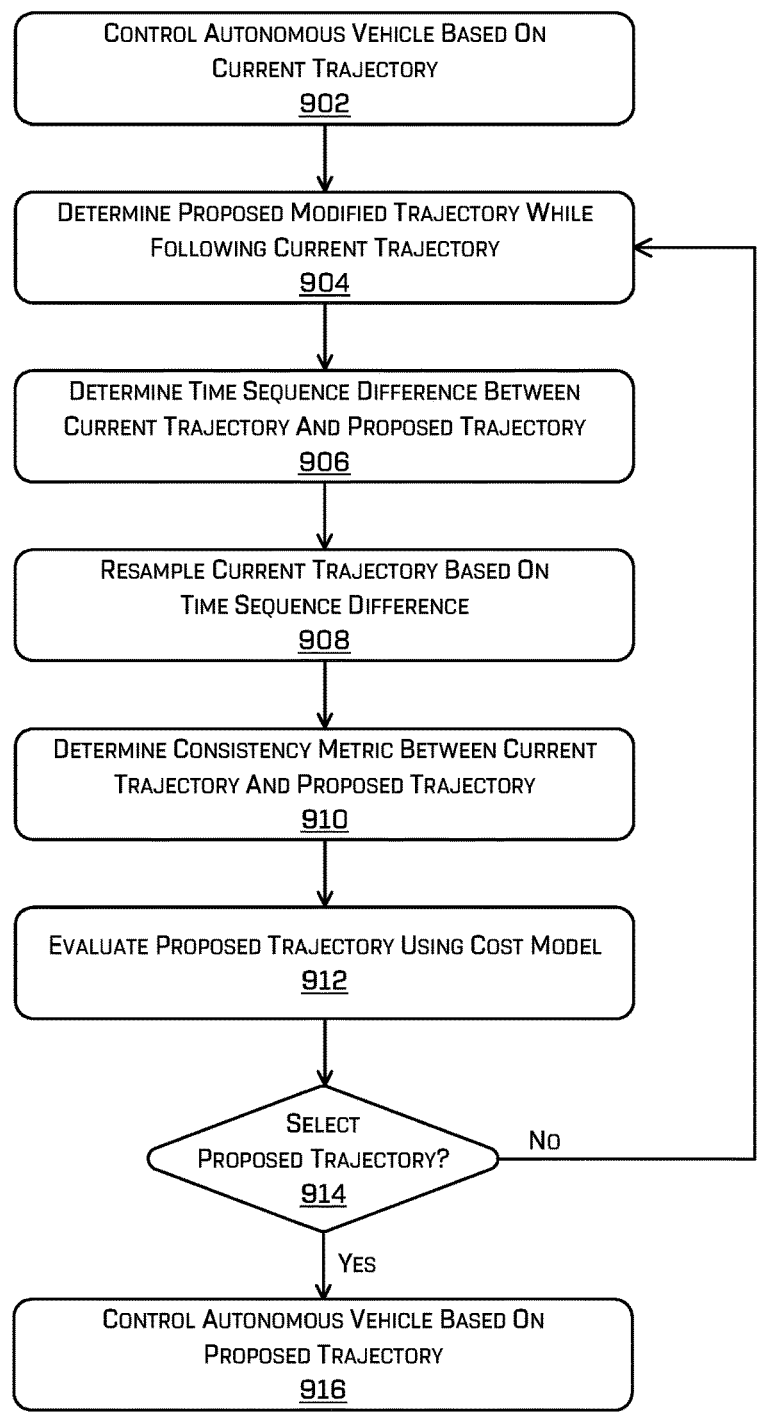
FIG. 9 is a flow diagram illustrating an example process of evaluating a proposed trajectory for an autonomous vehicle, based on temporal resampling of a current trajectory, in accordance with one or more examples of the disclosure

FIG. 9 is a flow diagram illustrating another example process 900 of evaluating a proposed trajectory for an autonomous vehicle, based on temporal resampling of a current trajectory. As with process 800, the operations in process 900 may be performed by an autonomous vehicle including a planning component. For instance, process 900 may be performed by the planning component 104 and/or the planning component 602, operating within an autonomous vehicle (e.g., vehicle 102). As described below, the planning component in this example may include an optimized trajectory component configured to perform temporal resampling of a previous trajectory, to determine trajectory consistency metrics between temporal trajectories having different time sequences.

Process 800 and process 900 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the planning component 104 may control an autonomous vehicle (e.g., vehicle 102) based on a current trajectory. As described above, the planning component 104 may control the vehicle 102 by executing the vehicle control commands stored in the current trajectory. The planning component 104 also may track the trajectory and monitor the states of the vehicle 102 relative to the vehicle states stored in the current trajectory. Based on the trajectory tracking and/or vehicle monitoring, the planning component may execute the appropriate control commands of the trajectory at the corresponding times and/or locations defined by the trajectory, thereby controlling the vehicle 102 to traverse the current trajectory to a target time/location.

At operation 904, the planning component 104 may determine a proposed modified trajectory at a time when the vehicle 102 is following the current trajectory. As noted above, new proposed trajectories may be determined, evaluated, and/or adopted by the planning component 104 repeatedly as the vehicle is traversing the environment. For instance, determining a new proposed trajectory in operation 904 may be performed periodically based on the planning cycle of the planning component 104, and/or based on a perceived change to the driving environment. Additionally, the current trajectory and/or proposed trajectory in this example may be temporal trajectories, including time-discretized vehicle states and/or vehicle control commands associated with a time sequence defined by the trajectory.

At operation 906, the planning component 104 may determine the time sequence associated with the proposed trajectory and the current trajectory, and may determine an offset (or other difference) between the time sequences of the trajectories. When the time sequence of current temporal trajectory is different from and/or incompatible with the time sequence of the proposed temporal trajectory, the planning component 104 may be unable to directly compare the proposed trajectory and the current trajectory to determine trajectory consistency. In some examples, the time sequences of the proposed trajectory and the current trajectory may be offset by a time duration amount, as described above in reference to FIG. 4A. Additionally or alternatively, the time sequences of the proposed trajectory and the current trajectory may have different time step durations, as described above in reference to FIG. 4B and FIGS. 5A-5B.

At operation 908, the planning component 104 may resample the current trajectory based on the time sequence difference between the proposed trajectory and the current trajectory. For example, to resample the current trajectory, the planning component 104 may initially determine a time difference between a time point in the current trajectory and a nearby time point in the proposed trajectory. The planning component 104 then may determine a new vehicle state and/or vehicle control time point for the current trajectory, corresponding to a coincident time point in the proposed trajectory. In some examples, to determine a new vehicle state and/or vehicle control commands when resampling the current trajectory, the planning component 104 may instantiate a vehicle model based on the vehicle 102 and assign the model to an initial state based on the previous time point of the current trajectory. The planning component 104 then may execute the control commands for time point 110 on the vehicle model, for a duration of time equal to the time difference (e.g., offset) between the current trajectory and the proposed trajectory.

At operation 910, the planning component 104 may determine one or more trajectory consistency metrics, by comparing the resampled time point(s) within the current trajectory to the corresponding time points in the proposed trajectory. In some examples, the planning component 104 may compare the vehicle states (e.g., positions, orientations, speeds, velocities, accelerations, etc.) and/or vehicle control commands (e.g., acceleration commands, steering commands, etc.) between the time points resampled for current trajectory and the coincident time points in the proposed trajectory, to the determine the trajectory consistency metric(s) between the trajectories at one or more coincident time points.

At operation 912, the planning component 104 may evaluate the proposed trajectory based at least in part on the trajectory consistency metrics determined in operation 910. As described above, after determining the degree of trajectory consistency between the current trajectory and proposed trajectory, the planning component 104 may use various models and/or algorithms to determine whether the proposed trajectory may be selected as the new trajectory for the vehicle 102 to follow within the environment. In various examples, the degree of trajectory consistency between a proposed and current trajectory may be used as input to one or more models and/or algorithms, and may be used alone or in combination with other possible cost factors to determine an optimized temporal trajectory for the vehicle 102 at various times while traversing the environment. Other cost factors may include, but are not limited to, optimizing vehicle dynamics, optimizing vehicle speed or velocity, minimizing lateral acceleration, optimizing lane positioning, maintaining a minimum safe distance from other objects or potential hazards, etc. When various costs are considered, the trajectory consistency metrics may be weighted differently in different examples. For instance, a greater weighting of the trajectory consistency metrics may result in greater trajectory consistency over time, while lesser weighting may result in less trajectory consistency over time in favor of other cost optimizations At operation 914, the planning component 104 may determine whether the proposed trajectory is to be selected (e.g., as an optimal trajectory) based on the results of the evaluation in operation 912. When the planning component 104 determines that the proposed trajectory is not an optimal trajectory for controlling the vehicle 102 at the current time (914:No), then process 900 may return to operation 904 to determine and evaluate another proposed trajectory. In contrast, when the planning component 104 determines that the proposed trajectory is an optimal trajectory for controlling the vehicle 102 (914:Yes), then at operation 916 the planning component 104 may switch to the proposed trajectory and may begin to control the vehicle 102 based on the vehicle states and/or control commands within the proposed trajectory. Operation 916 may be similar or identical to operation 902, described above, with the exception of the change in the trajectory executed by the planning component 104.

Example Clauses

A. A system comprising: one or more processors; and one or more non-transitory computer-readable media storing computer-executable instructions that, when executed, cause the system to perform operations comprising: determining a first trajectory for a vehicle, wherein the first trajectory includes a first set of time-discretized vehicle states, including a first vehicle state corresponding to a first time; controlling the vehicle for a first duration of time based at least in part on the first trajectory; determining, at a second time prior to the first time and after the first duration of time, to update the first trajectory; determining, based at least in part on the second time and the first trajectory, a resampled trajectory, wherein determining the resampled trajectory includes determining a second vehicle state corresponding to the second time; determining, based at least in part on the resampled trajectory, a second trajectory for the vehicle, wherein the second trajectory includes a second set of time-discretized vehicle states, including the second vehicle state and a third vehicle state corresponding to a third time, wherein the third time is different from the second time; and controlling the vehicle for a second duration of time after the first duration of time, based at least in part on the second trajectory.

B. The system as recited in paragraph A, wherein the first trajectory includes a first vehicle control command associated with the first time, and wherein determining the second vehicle state comprises: instantiating a vehicle model based on the vehicle; applying the first vehicle state to the vehicle model; and executing the first vehicle control command on the vehicle model for a duration of time based on a time difference between the first time and the second time.

C. The system as recited in paragraph A, wherein the first set of time-discretized vehicle states is associated with a first time step duration, and wherein determining the second trajectory comprises: determining a velocity of the vehicle; and determining, based at least in part on the velocity, a second time step duration associated with the second set of time-discretized vehicle states.

D. The system as recited in paragraph A, wherein determining the resampled trajectory comprises: determining a first velocity and a first steering angle associated with the first vehicle state; and determining a second steering angle associated with the second vehicle state, based at least in part on the first steering angle and a velocity-based steering rate activation function.

E. The system as recited in paragraph A, wherein determining the second trajectory comprises: determining a velocity and a steering angle associated with the second vehicle state; and determining, based at least in part on the velocity and the steering angle, that the second trajectory is compliant with a velocity-based steering angle restriction.

F. A method comprising: determining a first trajectory for a vehicle, wherein the first trajectory includes a first vehicle state associated with a first time; controlling the vehicle for a first duration of time based at least in part on the first trajectory; determining a second vehicle state associated with a second time after the first time, wherein determining the second vehicle state is based at least in part on the first trajectory and a time difference between the first time and the second time; determining a resampled trajectory for the vehicle, wherein the resampled trajectory includes the second vehicle state; determining a third vehicle state associated with a third time after the second time, wherein determining the third vehicle state is based at least in part on the resampled trajectory and a time difference between the second time and the third time; determining a second trajectory for the vehicle, wherein the second trajectory includes the third vehicle state; and controlling the vehicle for a second duration of time after the first duration of time, based at least in part on the second trajectory.

G. The method of paragraph F, wherein the first trajectory includes a first vehicle control command associated with the first time, and wherein determining the second vehicle state comprises: instantiating a vehicle model based on the vehicle; applying the first vehicle state to the vehicle model; and executing the first vehicle control command on the vehicle model for a duration of time based on the time difference between the first time and the second time.

H. The method of paragraph G, wherein determining the second trajectory comprises: determining an intermediate vehicle state based on the resampled trajectory; and comparing a difference between the intermediate vehicle state and a current vehicle state to a threshold.

I. The method of paragraph F, wherein: the first trajectory is associated with a first time sequence; and the second trajectory is associated with a second time sequence, wherein the second time sequence is offset from the first time sequence.

J. The method of paragraph I, wherein the first time sequence includes a first time step duration, and wherein determining the second trajectory comprises: determining a velocity of the vehicle associated with the second time; and determining a second time step duration for the second time sequence, based at least in part on the velocity of the vehicle, wherein the second time step duration is different from the first time step duration.

K. The method of paragraph F, wherein determining the second trajectory comprises: determining the third vehicle state, wherein determining the third vehicle state includes determining a steering angle associated with the third vehicle state based at least in part on a velocity-based steering rate activation function.

L. The method of paragraph F, wherein determining the second trajectory comprises: determining a vehicle state within the second trajectory, the vehicle state including a velocity and a steering angle; and determining, based at least in part on the velocity and the steering angle, that the second trajectory is compliant with a velocity-based steering angle restriction.

M. The method of paragraph L, wherein the velocity is zero, and wherein determining the second trajectory comprises: determining a spatial projection from the vehicle state, based at least in part on the steering angle; and evaluating the spatial projection from the vehicle state.

N. One or more non-transitory computer-readable media storing processor-executable instructions that, when executed by one or more processors, cause the one or more processors to perform operations comprising: determining a first trajectory for a vehicle, wherein the first trajectory includes a first vehicle state associated with a first time; controlling the vehicle for a first duration of time based at least in part on the first trajectory; determining a second vehicle state associated with a second time after the first time, wherein determining the second vehicle state is based at least in part on the first trajectory and a time difference between the first time and the second time; determining a resampled trajectory for the vehicle, wherein the resampled trajectory includes the second vehicle state; determining a third vehicle state associated with a third time after the second time, wherein determining the third vehicle state is based at least in part on the resampled trajectory and a time difference between the second time and the third time; determining a second trajectory for the vehicle, wherein the second trajectory includes the third vehicle state; and controlling the vehicle for a second duration of time after the first duration of time, based at least in part on the second trajectory.

O. The one or more non-transitory computer-readable media of paragraph N, wherein the first trajectory includes a first vehicle control command associated with the first time, and wherein determining the second vehicle state comprises: instantiating a vehicle model based on the vehicle; applying the first vehicle state to the vehicle model; and executing the first vehicle control command on the vehicle model for a duration of time based on the time difference between the first time and the second time.

P. The one or more non-transitory computer-readable media of paragraph O, wherein determining the second trajectory comprises: determining an intermediate vehicle state based on the resampled trajectory; and comparing a difference between the intermediate vehicle state and a current vehicle state to a threshold.

Q. The one or more non-transitory computer-readable media of paragraph N, wherein: the first trajectory is associated with a first time sequence; and the second trajectory is associated with a second time sequence, wherein the second time sequence is offset from the first time sequence.

R. The one or more non-transitory computer-readable media of paragraph Q, wherein the first time sequence includes a first time step duration, and wherein determining the second trajectory comprises: determining a velocity of the vehicle associated with the second time; and determining a second time step duration for the second time sequence, based at least in part on the velocity of the vehicle, wherein the second time step duration is different from the first time step duration.

S. The one or more non-transitory computer-readable media of paragraph N, wherein determining the second trajectory comprises: determining the third vehicle state, wherein determining the third vehicle state includes determining a steering angle associated with the third vehicle state based at least in part on a velocity-based steering rate activation function.

T. The one or more non-transitory computer-readable media of paragraph N, wherein determining the second trajectory comprises: determining a vehicle state within the second trajectory, the vehicle state including a velocity and a steering angle; and determining, based at least in part on the velocity and the steering angle, that the second trajectory is compliant with a velocity-based steering angle restriction.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the system to perform operations comprising:
      determining a first trajectory for a vehicle, wherein the first trajectory includes a first set of time-discretized vehicle states associated with a first set of times;
      controlling the vehicle for a first duration of time based at least in part on the first trajectory;
      receiving an updated trajectory defined by a second set of time-discretized vehicle states associated with a second set of times, the second set of times differing from the first set of times;
      determining, based at least in part on the first trajectory and the second set of times, a resampled trajectory including a third set of time-discretized vehicle states associated with the second set of times, wherein determining the resampled trajectory comprises applying an offset value to the first set of time-discretized vehicle states, wherein each of the third set of vehicle states is associated with a fixed time and is independent of a fixed physical location, and wherein the resampled trajectory comprises a trajectory for moving the vehicle from an off-route current vehicle state to a target vehicle state located on a driving lane of a route-based driving environment;
      determining a consistency metric between the updated trajectory and the resampled trajectory, based at least in part on a vehicle state difference determined based on the second and third sets of time-discretized vehicle states;
      determining a control trajectory for the vehicle, based at least in part on the consistency metric; and
      controlling the vehicle based at least in part on the control trajectory.

2. The system as recited in claim 1, wherein the first trajectory includes a first vehicle control command associated with a first time, and wherein determining the resampled trajectory comprises:
   instantiating a vehicle model based on the vehicle;
   applying a first vehicle state corresponding to the first time to the vehicle model; and
   executing the first vehicle control command on the vehicle model for a duration of time based on a time difference between the first set of time-discretized vehicle states and the second set of time-discretized vehicle states.

3. The system as recited in claim 1, wherein the first set of time-discretized vehicle states is associated with a first time step duration, and wherein determining the resampled trajectory comprises:
   determining a velocity of the vehicle; and
   determining, based at least in part on the velocity, a second time step duration associated with the second set of time-discretized vehicle states.

4. A method comprising:
   determining a first trajectory for a vehicle, wherein the first trajectory includes a first set of vehicle states spaced temporally from one another;
   resampling the first trajectory into a second set of vehicle states spaced temporally from one another and differing in time from the first set of vehicle states, wherein resampling the first trajectory comprises determining the second set of vehicle states by applying an offset value to the first set of vehicle states, wherein each of the second set of vehicle states is associated with a fixed time and is independent of a fixed physical location;
   determining an optimal trajectory for moving the vehicle from an off-route current vehicle state to a target vehicle state located on a driving lane of a route-based driving environment, the optimal trajectory comprising a third set of vehicle states spaced temporally from one another, wherein the third set of vehicle states correspond in time to the second set of vehicle states;
   determining a consistency metric between the first trajectory and the optimal trajectory, based at least in part on a vehicle state difference determined based on the second and thirds set of vehicle states;
      determining a control trajectory for the vehicle, based at least in part on the consistency metric; and
      controlling the vehicle based at least in part on the control trajectory.

5. The method of claim 4, wherein the first trajectory includes a first vehicle state comprising a first vehicle control command associated with a first time, and wherein resampling the first trajectory comprises:
   instantiating a vehicle model based on the vehicle;
   applying the first vehicle state to the vehicle model; and
   executing the first vehicle control command on the vehicle model for a duration of time based on a time difference between the first set of vehicle states and the second set of vehicle states.

6. The method of claim 5, wherein determining the consistency metric comprises:
   determining a second vehicle state based on the resampling of the first trajectory;
   determining a third vehicle state based on the optimal trajectory; and
   comparing a difference between the second vehicle state and the third vehicle state to a threshold.

7. The method of claim 4, wherein:
   the first set of vehicle states is associated with a first time sequence; and
   the second set of vehicle states is associated with a second time sequence, wherein the second time sequence is offset from the first time sequence.

8. The method of claim 7, wherein the first time sequence includes a first time step duration, and wherein resampling the first trajectory comprises:
   determining a velocity of the vehicle; and
   determining a second time step duration for the second time sequence, based at least in part on the velocity of the vehicle, wherein the second time step duration is different from the first time step duration.

9. The method of claim 4, wherein resampling the first trajectory comprises:
   determining a vehicle state within the second set of vehicle states, wherein determining the vehicle state includes determining a steering angle associated with the vehicle state based at least in part on a velocity-based steering rate activation function.

10. The method of claim 4, wherein resampling the first trajectory comprises:
    determining a vehicle state within the second set of vehicle states, the vehicle state including a velocity and a steering angle; and
    determining, based at least in part on the velocity and the steering angle, that the second set of vehicle states is compliant with a velocity-based steering angle restriction.

11. The method of claim 10, wherein the velocity is zero, and wherein resampling the first trajectory comprises:
    determining a spatial projection from the vehicle state, based at least in part on the steering angle; and
    evaluating the spatial projection from the vehicle state.

12. One or more non-transitory computer-readable media storing processor-executable instructions that, when executed by one or more processors, cause the one or more processors to perform operations comprising:
    determining a first trajectory for a vehicle, wherein the first trajectory includes a first set of vehicle states spaced temporally from one another;
    resampling the first trajectory into a second set of vehicle states spaced temporally from one another and differing in time from the first set of vehicle states, wherein resampling the first trajectory comprises determining the second set of vehicle states by applying an offset value to the first set of vehicle states, wherein each of the second set of vehicle states is associated with a fixed time and is independent of a fixed physical location;
    determining an optimal trajectory for moving the vehicle from an off-route current vehicle state to a target vehicle state located on a driving lane of a route-based driving environment, the optimal trajectory comprising a third set of vehicle states spaced temporally from one another, wherein the third set of vehicle states correspond in time to the second set of vehicle states;
    determining a consistency metric between the first trajectory and the optimal trajectory, based at least in part on a vehicle state difference determined based on the second and thirds set of vehicle states;
       determining a control trajectory for the vehicle, based at least in part on the consistency metric; and
       controlling the vehicle based at least in part on the control trajectory.

13. The one or more non-transitory computer-readable media of claim 12, wherein the first trajectory includes a first vehicle state comprising a first vehicle control command associated with a first time, and wherein resampling the first trajectory comprises:
    instantiating a vehicle model based on the vehicle;
    applying the first vehicle state to the vehicle model; and
    executing the first vehicle control command on the vehicle model for a duration of time based on a time difference between the first set of vehicle states and the second set of vehicle states.

14. The one or more non-transitory computer-readable media of claim 13, wherein determining the consistency metric comprises:
- determining a second vehicle state based on the resampling of the first trajectory;
- determining a third vehicle state based on the optimal trajectory; and
- comparing a difference between the second vehicle state and the third vehicle state to a threshold.

15. The one or more non-transitory computer-readable media of claim 12, wherein:
- the first set of vehicle states is associated with a first time sequence; and
- the second set of vehicle states is associated with a second time sequence, wherein the second time sequence is offset from the first time sequence.

16. The one or more non-transitory computer-readable media of claim 15, wherein the first time sequence includes a first time step duration, and wherein resampling the first trajectory comprises:
- determining a velocity of the vehicle; and
- determining a second time step duration for the second time sequence, based at least in part on the velocity of the vehicle, wherein the second time step duration is different from the first time step duration.

17. The one or more non-transitory computer-readable media of claim 12, wherein resampling the first trajectory comprises:
- determining a vehicle state within the second set of vehicle states, wherein determining the vehicle state includes determining a steering angle associated with the vehicle state based at least in part on a velocity-based steering rate activation function.

18. The one or more non-transitory computer-readable media of claim 12, wherein resampling the first trajectory comprises:
- determining a vehicle state within the second set of vehicle states, the vehicle state including a velocity and a steering angle; and
- determining, based at least in part on the velocity and the steering angle, that the second set of vehicle states is compliant with a velocity-based steering angle restriction.

* * * * *